(12) United States Patent
Isotani et al.

(10) Patent No.: US 8,122,578 B2
(45) Date of Patent: Feb. 28, 2012

(54) METHOD AND APPARATUS OF INTEGRATING WORK

(75) Inventors: Seiji Isotani, Tochigi (JP); Kenichi Ohno, Tochigi (JP); Yoshito Otake, Tochigi (JP); Ryo Nakajima, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1232 days.

(21) Appl. No.: 11/581,571

(22) Filed: Oct. 17, 2006

(65) Prior Publication Data

US 2007/0087609 A1 Apr. 19, 2007

(30) Foreign Application Priority Data

Oct. 18, 2005 (JP) .............................. P. 2005-303366

(51) Int. Cl.
*B23Q 17/00* (2006.01)
(52) U.S. Cl. .................. 29/407.08; 439/325; 296/146.7
(58) Field of Classification Search ............... 29/407.08; 296/146.7
See application file for complete search history.

(56) References Cited

U.S. PATENT DOCUMENTS

| | | | | |
|---|---|---|---|---|
| 4,674,910 A | * | 6/1987 | Hayashi | ...................... 403/408.1 |
| 6,932,416 B2 | * | 8/2005 | Clauson | ...................... 296/146.7 |
| 2002/0167187 A1 | * | 11/2002 | Murar | ........................ 296/39.1 |

FOREIGN PATENT DOCUMENTS

| | | | |
|---|---|---|---|
| EP | 196 50 925 A1 | | 6/1997 |
| JP | 3-292276 | | 12/1991 |
| JP | 4-210346 | | 7/1992 |
| JP | 5-200638 | | 8/1993 |
| JP | 05200638 A | * | 8/1993 |
| JP | 07212944 A | * | 8/1995 |

OTHER PUBLICATIONS

Office Action dated Feb. 13, 2009 issued by the Japanese Patent Office corresponding to Japanese patent application No. 2005-303366—Notice of Reasons for Rejection with English translation.
Office Action corresponding to Chinese application No. 200610135726 1dated Dec. 5, 2008.

* cited by examiner

*Primary Examiner* — Derris Banks
*Assistant Examiner* — Azm Parvez
(74) *Attorney, Agent, or Firm* — Kratz, Quintos & Hanson, LLP

(57) ABSTRACT

An apparatus 30 for coupling a first member 15 and a second member 17 by a clip and a screw is constituted by member moving means 131L, 131R for moving the second member 17 relative to the first member 15, reaction force detecting means 132L, 132R provided to the member moving means 131L, 131R for detecting a press reaction force generated when the second member 17 is matched to the first member 15, clip fitting determining means 135L, 135R for determining whether the clip is correctly fitted to a clip hole by reading the reaction force detected by the reaction force detecting means 132L, 132R, and screw fastening means 149 for fastening the screw when acceptable information is provided by the clip fitting determining means 135L, 135R.

3 Claims, 19 Drawing Sheets

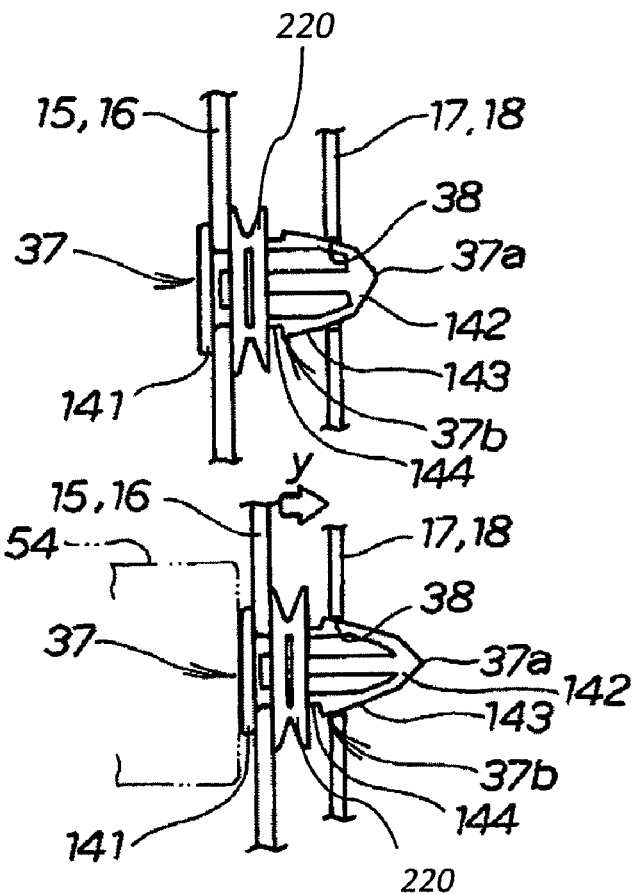
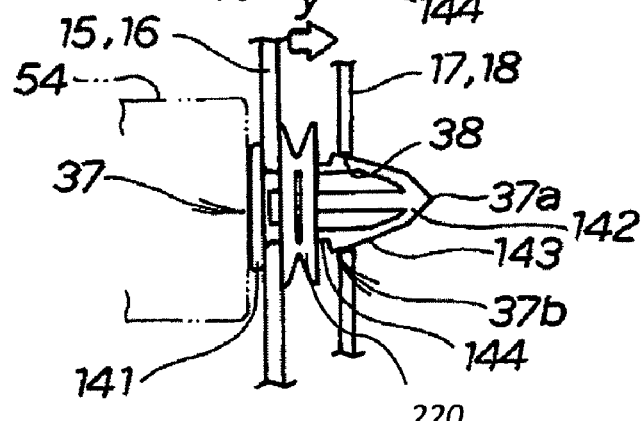
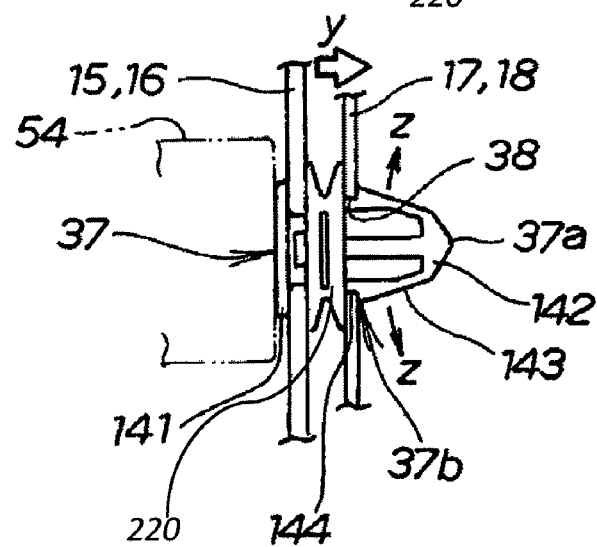

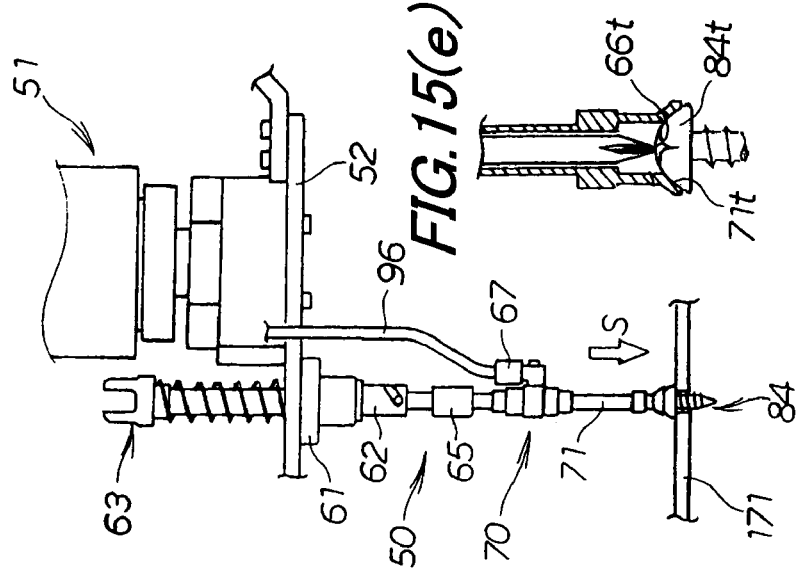
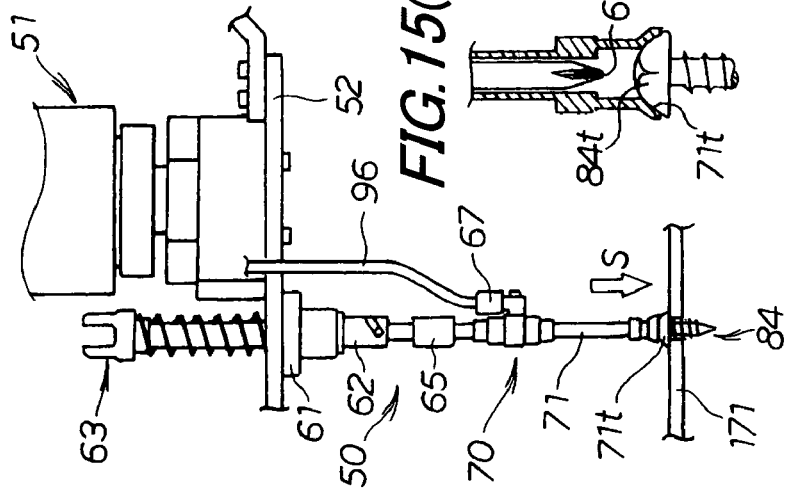
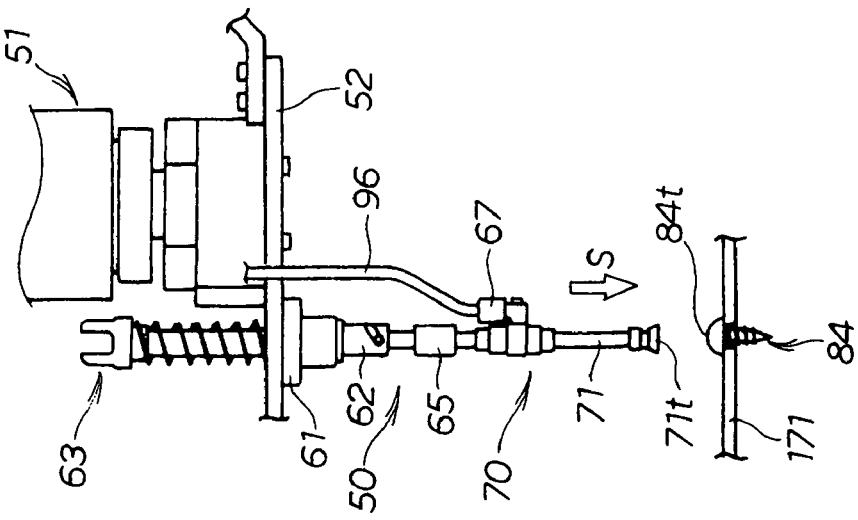

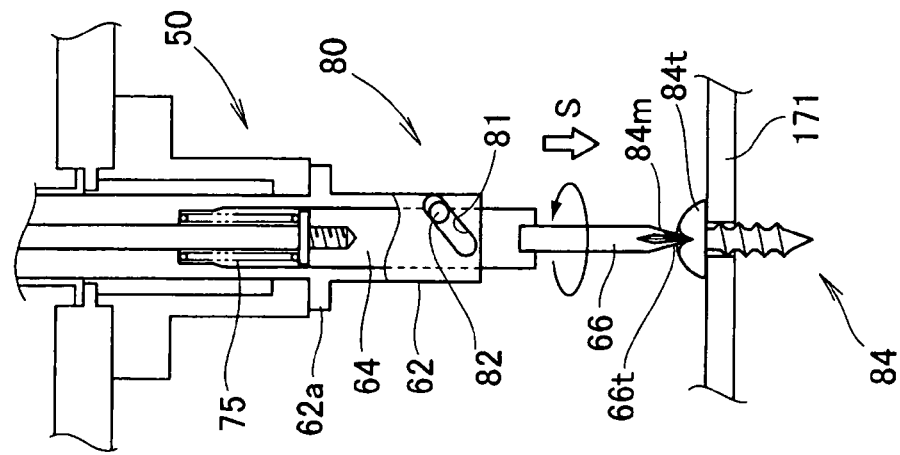
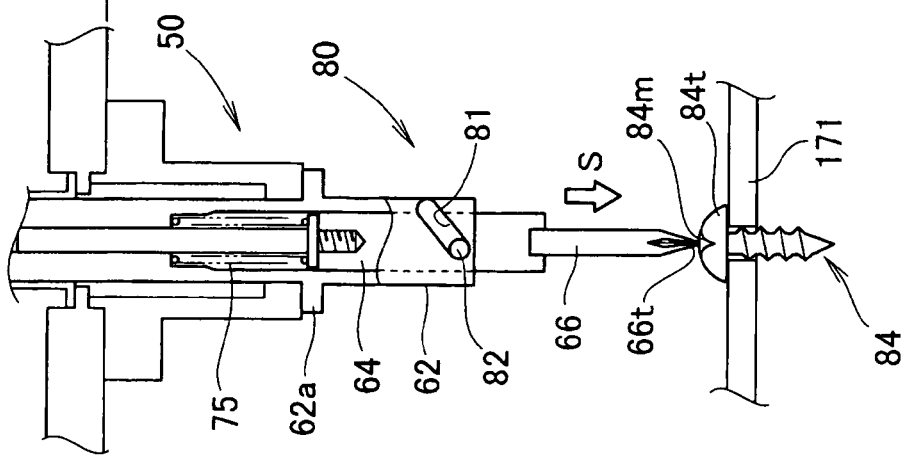

METHOD AND APPARATUS OF INTEGRATING WORK

This application claims foreign priority from Japanese Patent Application No. 2005-303366, filed Oct. 18, 2005, the entire contents of which are hereby incorporated by reference.

BACKGROUND OF THE INVENTION

1. Field of the Invention

The present invention relates to a technology of integrating a work for coupling a first member and a second member by a clip and a screw.

2. Related Art

In a background art, there is known an apparatus of integrating a work for coupling a first member and a second member by a clip and a screw (refer to, for example, JP-A-04-210346 (FIG. 1)).

The apparatus of JP-A-04-210346 will be explained in reference to the following view.

FIG. 22 is a view for explaining a basic constitution of the technology of the background art, a door 201 of an automobile constituting a first member is transferred to a work loading portion 203 by an overhead conveyer 202 and is moved to be mounted on a mobile carrier 204 along with a hanger 205 at the work loading portion 203.

Further, the mobile carrier 204 holding the mounted door 201 is successively moved through assembly zones 206 through 208, and an operator 210 arranged at the assembly zones 206 through 208 successively integrates the second part and a plurality of other parts to the door 201.

Further, the second member and the plurality of other parts integrated to the door 201 are loaded on the mobile carrier 204 at a part arranging zone 211 before being moved to be mounted on the mobile carrier 204.

Meanwhile, there is a case of fixing the second part to the door 201 by a clip and a bolt. When a torque of the bolt is detected by a nut runner, a fastening state thereof can be controlled.

On the other hand, the clip is a part which is pushed to a hole to be engaged with an edge of the hole by widening a front end portion thereof which is made free by passing the hole and therefore, it is difficult to detect whether the clip can excellently be mounted to the hole, and in the background art, the detection depends on optical confirmation of the operator.

There poses a problem that an operational time period is prolonged by an amount of the optical confirmation and there is also a concern of oversight by the operator.

SUMMARY OF THE INVENTION

One or more embodiments of the present invention provide a technology capable of automating confirmation of mounting a clip in coupling a first member and a second member by a clip and a screw.

In accordance with one or more embodiments of the present invention, a method of integrating a work for coupling a first member and a second member by a clip and a screw is provided with: a preparing step of making the first member face the second member in a state of attaching a base portion of the clip to the first member; a clip fitting step of fitting the clip to a clip hole provided to the second member by pressing the first member to the second member; and a screw fastening step of connecting the first member to the second member by the screw. In the clip fitting step, a press reaction force when the first member is pressed to the second member is detected and it is determined whether the clip is correctly fitted based on a change in the press reaction force.

Further, in accordance with one or more embodiments of the present invention, an apparatus of integrating a work for coupling a first member and a second member by a clip and a screw is provided with: member moving means for moving the second member relative to the first member; reaction force detecting means provided to the member moving means for detecting a press reaction force generated when the second member is matched to the first member; clip fitting determining means for determining whether the clip is correctly fitted to a clip hole by reading the reaction force detected by the reaction force detecting means, and screw fastening means for fastening the screw when acceptable information is provided by the clip fitting determining means.

In the method of the one or more embodiments, in the clip fitting step, the press reaction force when the first member is pressed to the second member is detected and it is determined whether the clip is correctly fitted based on the change in the press reaction force.

That is, in coupling the first member and the second member by the clip and the screw, confirmation of mounting the clip can be automated, a burden on an operator can be alleviated, and reliability of confirmation of mounting can be promoted.

In addition, the press reaction force can be detected by an inexpensive pressure sensor, the change in the press reaction force can be determined by an inexpensive control portion and therefore, the method of the embodiments can be embodied by inexpensive cost.

In the apparatus of the embodiments, the apparatus of integrating the work is provided with the clip fitting determining means for determining acceptability by reading the reaction force detected by the reaction force detecting means and therefore, it is not necessary to confirm integration of the work by optical observation of the operator.

In addition, the inexpensive pressure sensor can be provided for the reaction force detecting means, the inexpensive control portion can be provided for the clip fitting determining means and therefore, the apparatus of the embodiments can be embodied by the inexpensive apparatus.

That is, the apparatus of integrating the work of the embodiments is provided with: the member moving means; the reaction force detecting means provided on the member moving means; and the screw fastening means for fastening the screw when acceptable by the clip fitting determining means and therefore, the first member and the second member can be integrated fully automatically.

Other aspects and advantages of the invention will be apparent from the following description and the appended claims.

BRIEF DESCRIPTION OF THE DRAWINGS

FIG. 4 is a side view of a jig base mounted with a screw fastening jig and the like.

FIG. 12(a) illustrates an operation view for explaining that a clip provided on a side of a first member is fitted to a second member, in a preparing step.

FIG. 12(b) illustrates the operation view for explaining that the clip provided on the side of the first member is fitted to the second member, in a clip fitting step.

FIG. 12(c) illustrates the operation view for explaining that the clip provided on the side of the first member is fitted to the second member, in the clip fitting step.

FIG. 15(a) illustrates an operation view for explaining that a front end portion of a cylindrical member is brought into contact with a head of the screw, in which the screw fastening jig is made to face the screw arranged at the screw pressing portion.

FIG. 15(b) illustrates the operation view for explaining that the front end portion of the cylindrical member is brought into contact with the head of the screw, in which the screw fastening jig is moved in arrow mark S direction further from the position of FIG. 15(a).

FIG. 15(c) is a sectional view enlarging a part of FIG. 15(b).

FIG. 15(d) illustrates the operation view for explaining that the front end portion of the cylindrical member is brought into contact with the head of the screw, in which the screw fastening jig is moved in arrow mark S direction further from the position of FIG. 15(b).

FIG. 15(e) is a sectional view enlarging a part of FIG. 15(d).

FIG. 16(a) illustrates an operation view for explaining that a driver bit is brought in mesh with the head of the screw, in which a reaction force is not exerted to the front end portion of the driver bit.

FIG. 16(b) illustrates the operation view for explaining that the driver bit is brought in mesh with the head of the screw, in which the screw fastening jig is moved further in the arrow mark S direction by a displacement y.

DETAILED DESCRIPTION OF THE EXEMPLARY EMBODIMENTS

Exemplary embodiments of the invention will be described with reference to the accompanying drawings. Further, a view is viewed in a direction of a notation.

Figure 1:
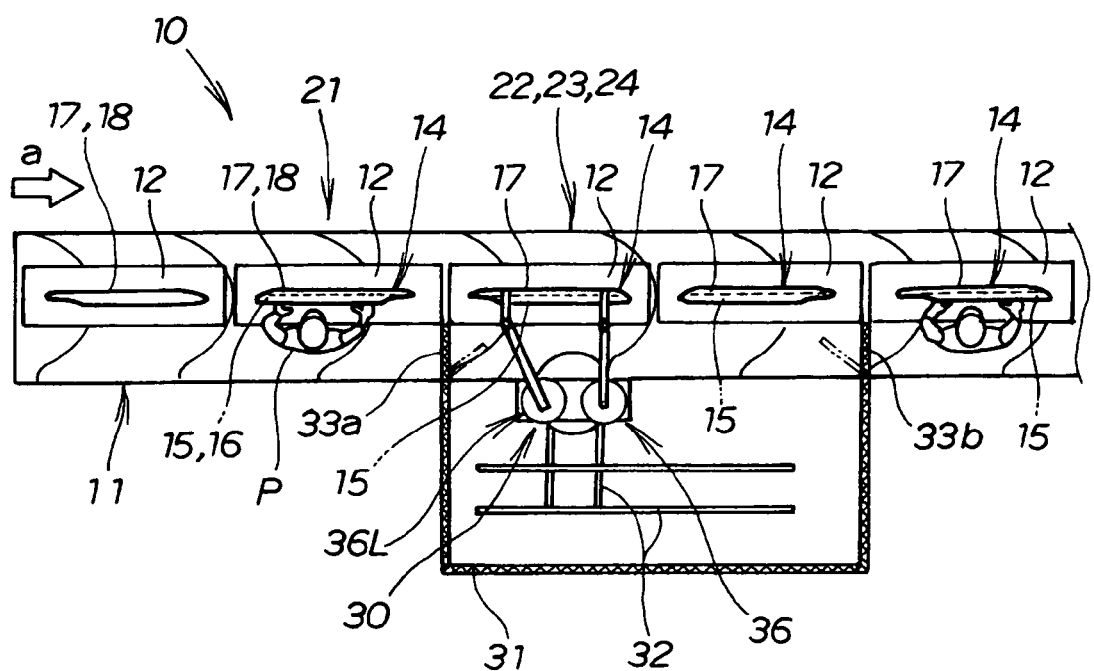
FIG. 1 is a plane view for explaining steps of integrating works according to an exemplary embodiment.

FIG. 1 is a plane view for explaining a step of integrating a work according to a exemplary embodiment, and a step 10 of integrating a work is a step provided on a conveyer 11 and includes a plurality of support jigs 12 . . . designates a plurality. The same as follows) on the conveyer 11. Further, works 14 . . . are mounted on the support jigs 12 . . . .

Here, a single work 14 includes a first member 15 constituting an integrating work and a second member 17 constituting an integrated work.

The step 10 of integrating works comprises a preparing step 21 for making the first member 15 face the second member 17, a pressing step 22 of pressing the first member 15 to the second member 17, and a screw fastening step 23 for connecting the first member 15 to the second member 17.

An apparatus 30 of integrating the works is commonly utilized in the pressing step 22 and the screw fastening step 23 and therefore, the pressing step 22 and the screw fastening step 23 can be provided at the same step. Further, the support jig 12 mounted with the second member 17 constituting one of the work 14 is positioned in the step, and the first member 15 is integrated to the second member 17 by utilizing the apparatus 30 of integrating the work. Specifically, the work 14 is pressed to be fitted to a predetermined position and the screw is fastened.

Numeral 31 designates a safety fence for surrounding a surrounding of the apparatus 30 of integrating the work, numeral 32 designates a rail for making the apparatus 30 of integrating the work orthogonally to or in parallel with the step 10 of integrating the work, notations 33a, 33b designate an entrance and an exit to and from the apparatus 30 of integrating the work.

The rail 32 is provided orthogonally to and in parallel with the step 10 of integrating the work on a floor face, and articulated robots 36L, 36R are movably arranged at the rail 32.

Figure 2:
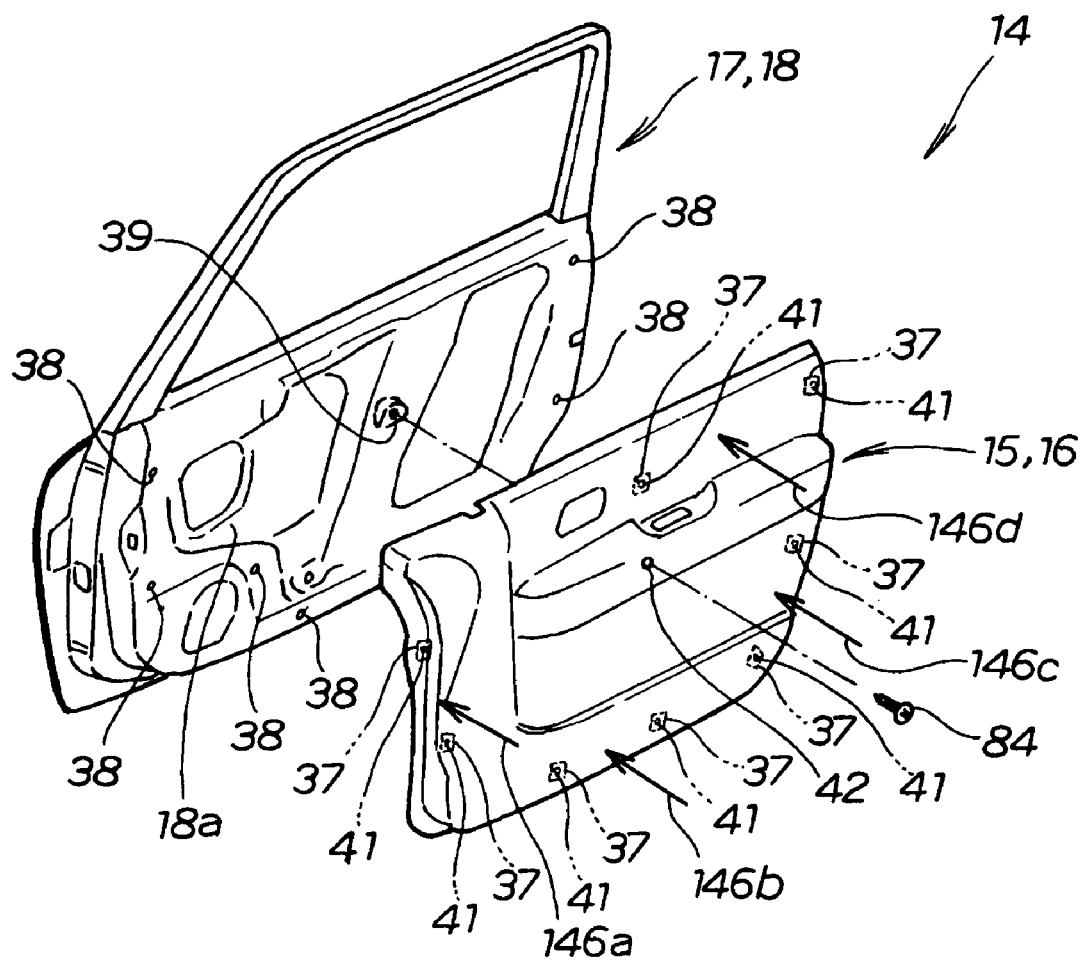
FIG. 2 is a perspective view showing the works.

FIG. 2 is a perspective view showing the works according to the exemplary embodiment. In the exemplary embodiment, the first member 15 is a door trim 16, and the second member 17 is a door panel 18.

A position of the door trim 16 (or, lining member 16) is matched to the door panel 18, by pressing a surface of the door trim 16, a plurality of clips 37 . . . previously attached to the door trim 16 are fitted to holes 38 . . . , thereafter, the door panel 18 and the door trim 16 are integrated by fastening a screw 84.

Specifically, the door trim 16 having clip coupling portions 41 . . . and a screw coupling portion 42 is attached to the door panel 18 having the clip holes 38 . . . and a screw hole 39.

In the following, in the step of pressing the door trim 16 constituting the first member 15 to the door panel 18 constituting the second member 17, the clips 37 . . . attached to the door trim 16 are fitted to the holes 38 . . . opened at the door panel 18 and therefore, the pressing step 22 is referred to as a clip fitting step 24.

Referring back to FIG. 1, in the preparing step 21, the door trim 16 is made to cover a face 18b on an inner side of the door panel 18 mounted with the support jig 12, and the door trim 16 is set to the door panel 18. Further, the door trim 16 is set by an operator P.

Figure 3:
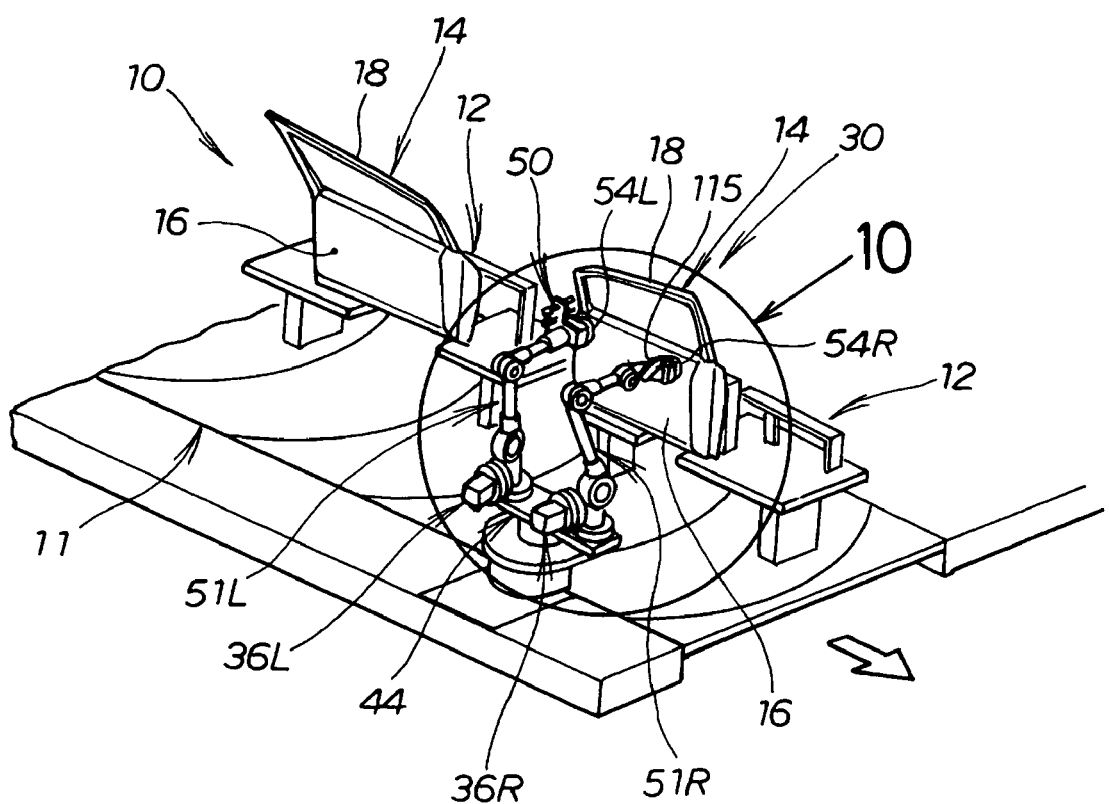
FIG. 3 is a perspective view for explaining an apparatus of integrating the works.

FIG. 3 is a perspective view for explaining the apparatus of integrating the work, and the apparatus 30 of integrating the work is provided with a robot board 44 constituting a base portion of the robot and two pieces of the articulated robots 36L, 36R are aligned to be arranged on the robot board 44.

The left articulated robot 36L includes a robot arm 51L and includes a press pad 54L at a front end portion of the robot arm 51L.

The right articulated robot 36R includes a robot arm 51R and includes a press pad 54R at a front end portion of the robot arm 51R.

An explanation will be given as follows of structures of the press pads 54L, 54R provided at front end portions of the respective robot arms 51L, 51R, a screw fastening jig 50 and a screw fastening drive portion 115.

Figure 4:
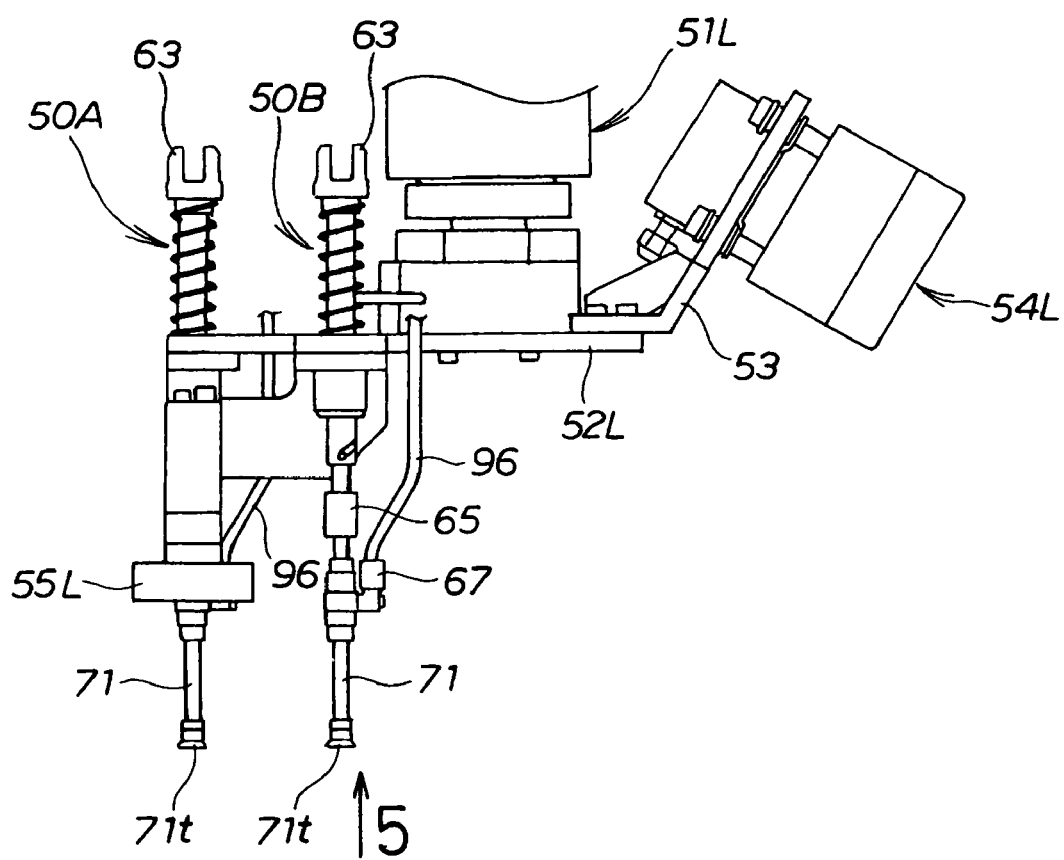

FIG. 4 is a side view of a jig base mounted with the screw fastening jig, a jig base 52L is attached to a front end portion of the robot arm 51, the jig base 52L is mounted with screw fastening jigs 50A through 50C (only 50A, 50B on this side are shown) and mounted with the press pad 54L by way of a stay member 53L.

The screw fastening jigs 50A through 50C absorb to hold screws at front ends thereof and move the screws to the work to face a position of fastening the work in a state as it is.

Further, the press pad 54L presses the door trim (notation 16 of FIG. 3) constituting the integrating work by a predetermined force to integrate the door trim to a predetermined position of the door panel (notation 18 of FIG. 3) constituting the integrated work.

That is, the first member 15 (door trim 16) is moved to the second member 17 (door panel 18) by the press pad 54L.

In addition thereto, there is provided reaction force detecting means, not illustrated, provided to the press pad 54L for detecting a press reaction force generated when the door trim 16 is matched to the door panel 18.

Figure 5:
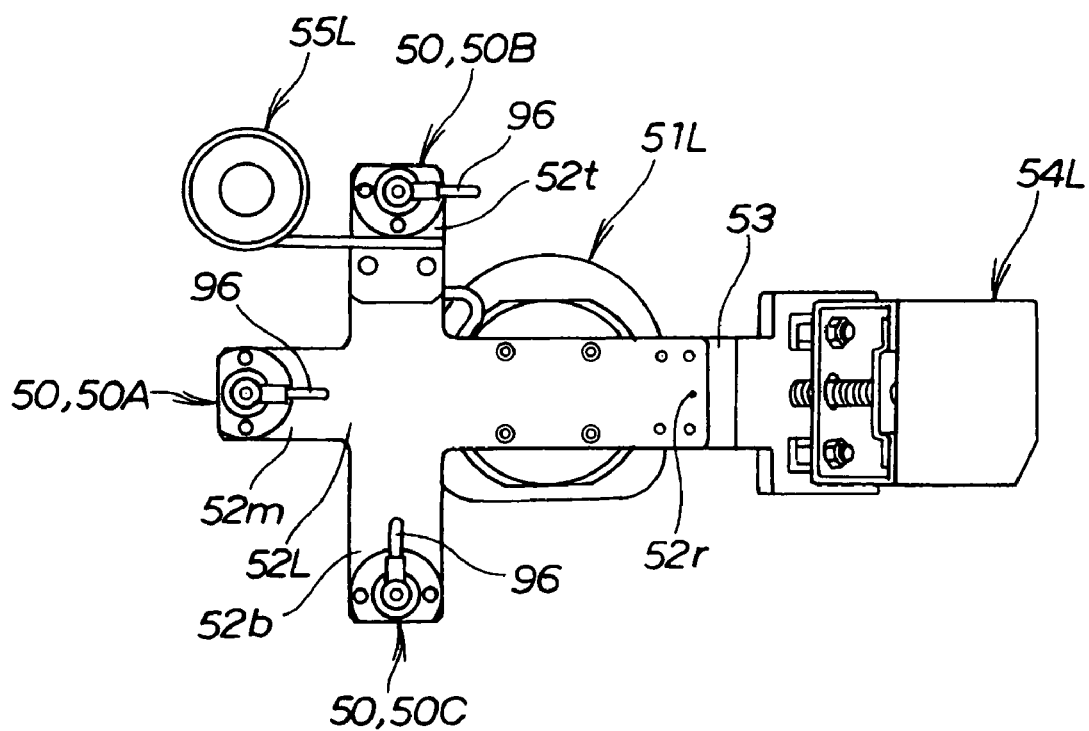
FIG. 5 is a view taken from 5 arrow mark of FIG. 4.

FIG. 5 is a 5 arrow mark view, the jig base 52L in a cross-like shape is extended from a front end portion of the robot arm 51L in a left direction, an upper direction and a lower direction, and the three screw fastening jigs 50A through 50C are attached to a left end 52m, an upper end 52t and a lower end 52b. Specifications of the screw fastening jigs 50A through 50C are constituted by the same specification. Further, a right end 52r of the jig base 52L is attached with the press pad 54L by way of the stay member 53L.

Notation 55L designates a CCD camera unit for recognizing a position of the work.

Figure 6:
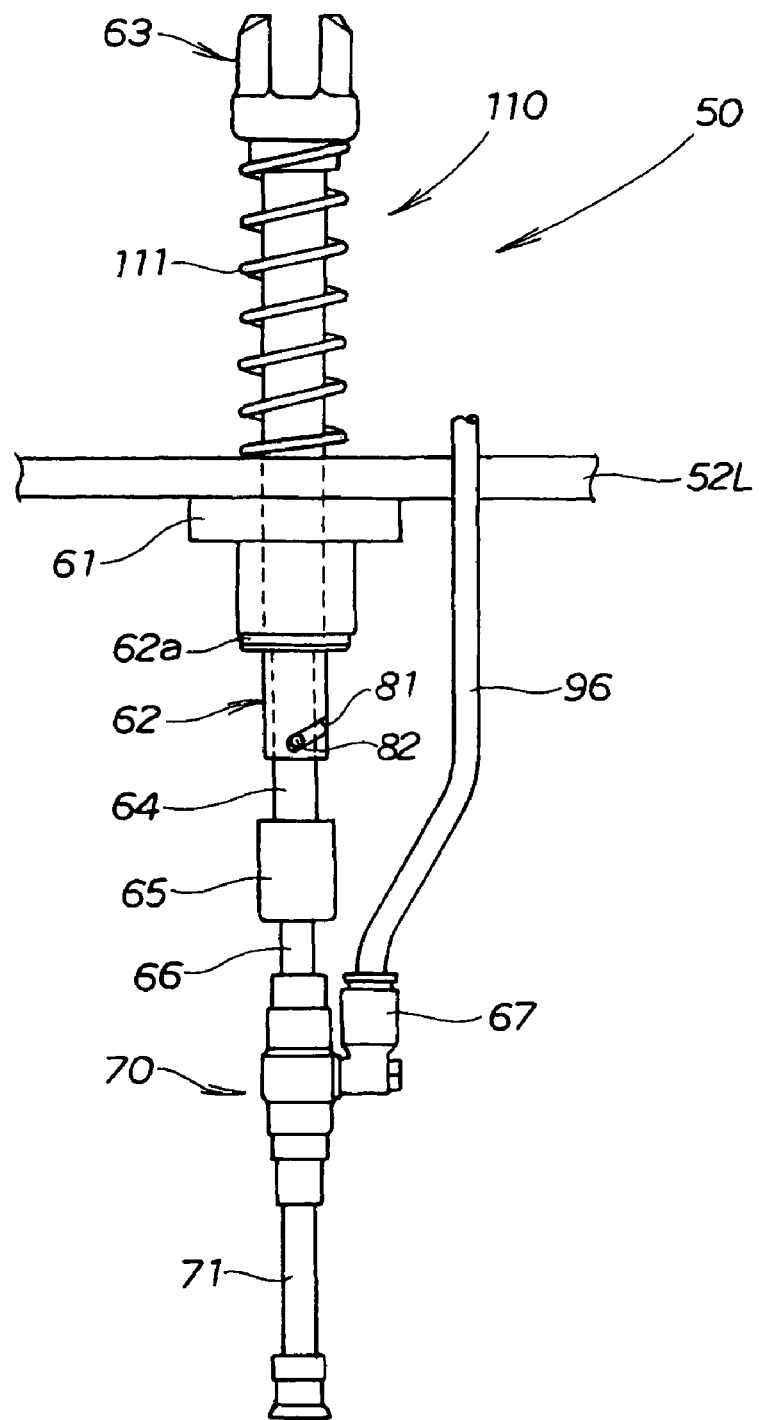
FIG. 6 is a side view of the fastening jig.

FIG. 6 is a side view of the screw fastening jig.

The screw fastening jig 50 is provided at the jig base 52L and constitutes main constituent elements by a holder member 61 for holding the screw fastening jig 50 at the jig base 52L, a rotating cylinder 62 extended in an up and down direction by penetrating the holder member 61 for transmitting a fastening force, a recess chuck portion 63 provided at an upper end portion of the rotating cylinder 62 and exerted with a fastening force from driving means, not illustrated, a rotating shaft 64 similarly inserted through the rotating cylinder 62 from a lower side of the rotating cylinder 62 and provided to be able to move forward, move rearward, and pivot in an axial direction of the rotating cylinder 62, a driver bit 66 extended from the rotating shaft 64 to a lower side of the drawing by way of a connecting member 65, a cylindrical member 71 covered around a surrounding of the driver bit 66, and a screw adsorbing and holding mechanism 70 including a vacuuming tube 67 communicated with the cylindrical member 71 for adsorbing the screw.

That is, the jig base 52L attached to the robot arm 51 is provided with the rotating cylinder 62 movably in the axial direction, the rotating cylinder 62 is provided with the rotating shaft 64 movably in the axial direction, the rotating shaft 64 is attached with the driver bit 66 in a rod-like shape movably in the axial direction, the driver bit 66 is attached with the cylindrical member 71 movably in the axial direction, and the vacuuming tube 67 is connected to the cylindrical member 71.

Figure 7:
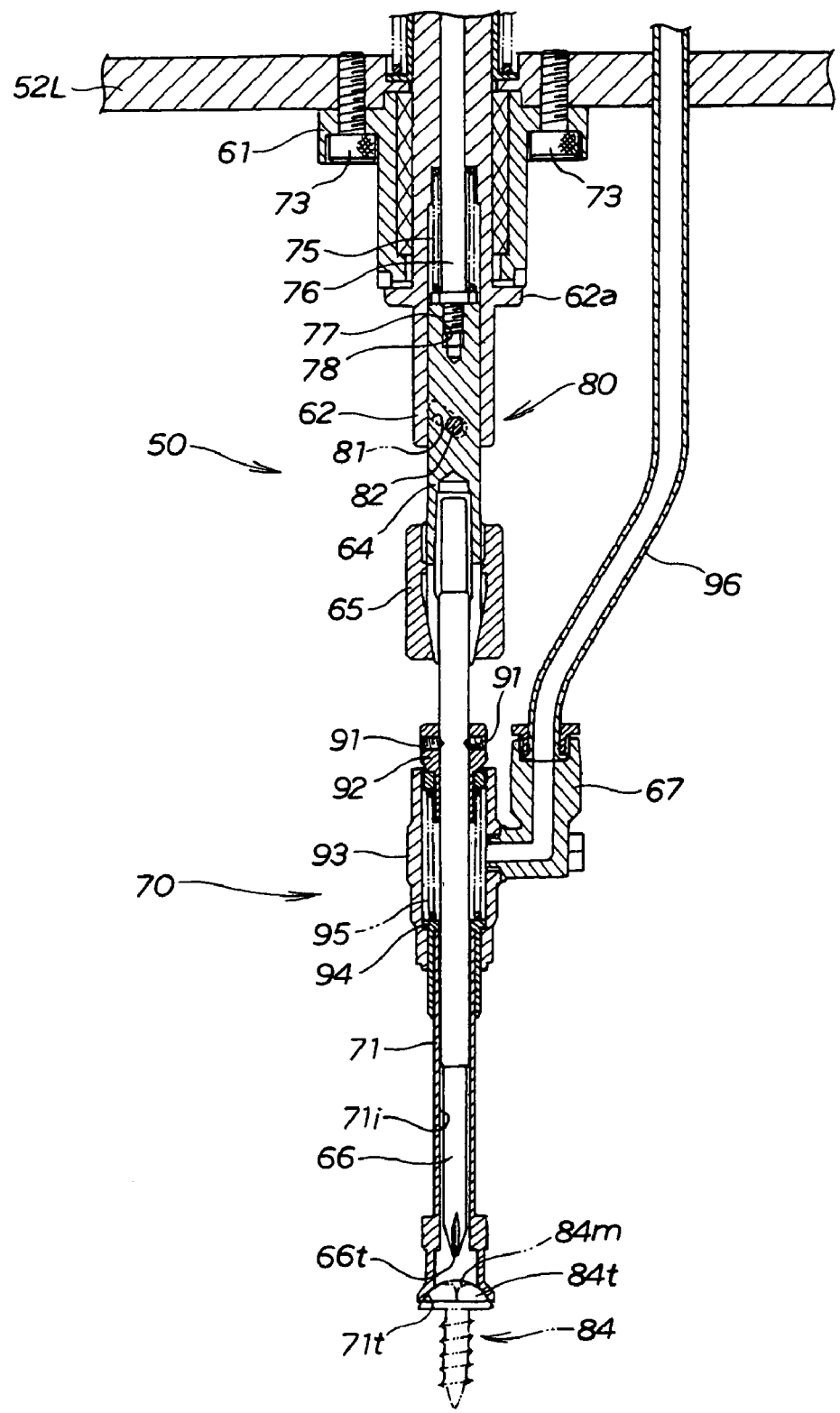
FIG. 7 is a sectional view of an essential portion of the screw fastening jig.

FIG. 7 is a sectional view of an essential portion of the screw fastening jig. The screw fastening jig 50 is attached with the holder member 61 from a lower side of the jig base 52L by way of bolts 73, 73, the rotating cylinder 62 is fitted to the holder member 61 from a lower side thereof, similarly, a center shaft 76 for restricting movement in a radius direction is inserted to be fitted to a second spring member 75 from a lower side, a female screw portion 78 of the rotating shaft 64 is screwed to a male screw portion 77 provided at a lower end portion of the center shaft 76, the center shaft 76 and the rotating shaft 64 are integrated, and the rotating shaft 64 is fitted to the rotating cylinder 62.

At this occasion, there is provided a rotating shaft turning mechanism 80 between the rotating cylinder 62 and the rotating shaft 64 such that the rotating shaft 64 is turned when the rotating shaft 64 moves rearward relative to the rotating cylinder 62 by forming a spiral groove 81 at a side face of the rotating cylinder 62, fitting the rotating shaft 64 to the spiral groove 81 and providing a pin 82 at the rotating shaft 64.

A detailed explanation will be given of the rotating shaft turning mechanism 80, the screw adsorbing and holding mechanism 70, and a mechanism 110 of rotating and feeding the rotating cylinder constituting essential mechanisms of the screw fastening jig 50.

First, the rotating shaft turning mechanism 80 will be explained.

The rotating shaft turning mechanism 80 serves to fit a front end portion 66t of the driver bit 66 to a fastening groove 84m provided to a head 84t of a screw 84. Further, when the front end portion 66t of the driver bit is touched to the head 84t of the screw and the rotating shaft 64 is exerted with a force in an upper direction, the rotating shaft 64 is turned while being moved rearward along the spiral groove 81.

Further, since the rotating shaft 64 is a member urged from an upper side by the second spring member 75 when the driver bit 66 is separated from the head 84t of the screw and the force in the upper direction is nullified, the rotating shaft 64 is going to return to an original position.

That is, the rotating shaft turning mechanism 80 comprises the spiral groove 81 provided at the rotating cylinder 62, and the pin 82 provided at the rotating shaft 64 and fitted to the spiral groove 81, the rotating shaft turning mechanism 80 is provided between the rotating cylinder 62 and the rotating shaft 64, and rotates the rotating shaft 64 relative to the rotating cylinder 62 by operating the rotating shaft 64 to move rearward relative to the rotating cylinder 62.

The rotating shaft turning mechanism 80 is constituted by a simple structure comprising the spiral groove 81 provided at the rotating cylinder 62, and the pin 82 provided at the rotating shaft 64 and fitted to the spiral groove 81 and therefore, achieves an advantage of capable of restraining fabrication cost of the screw fastening jig 50.

Next, the screw adsorbing and holding mechanism 70 will be explained.

The screw adsorbing and holding mechanism 70 comprises a cylindrical holder 92 fixed to an upper portion of the driver bit 66 by way of fastening members 91, 91, a cylindrical body member 93 held by the cylindrical holder 92, a slider 94 included in the cylindrical body member 93 and provided slidably in the axial direction at inside of the body member 93, a first spring member 95 for urging the slider 94, the slider 94 urged by the first spring member 95 and provided to be able to move forward and rearward in the axial direction of the driver bit 66 relative to the cylindrical holder 92, the cylindrical member 71 integrally attached to the slider 94 for adsorbing the head 84t of the screw at a front end portion thereof, and the vacuuming tube 67 communicated with inside of the cylindrical member 71 and provided at a side portion of the cylindrical body member 93.

The vacuuming tube 67 is connected to a vacuum pump, not illustrated, through a pipe 96.

A front end portion 71t of the cylindrical member 71 is provided to be able to move forward and rearward in the axial direction relative to the front end portion 66t of the driver bit 66, and the driver bit 66 is provided to be able to turn and move forward and rearward relative to the jig base 52.

Finally, the mechanism 110 of rotating and feeding the rotating cylinder will be explained.

Referring back to FIG. 6, the mechanism 110 of rotating and feeding the rotating cylinder 62 serves to move the rotating cylinder 62 to a lower side relative to the jig base 52 by rotating the driver bit 66 by a predetermined fastening torque and exerting a predetermined force to a lower side of the drawing.

The rotating cylinder 62 is penetrated through the holder member 61, the rotating cylinder 62 is provided movably in the axial direction relative to the holder member 61, a third spring member 111 is fitted to the rotating cylinder 62 from an upper side of the jig base 52L, thereafter, the rotating cylinder 62 is attached with the recess chuck portion 61 connected to a screw fastening drive portion as explained in reference to the following view. Notation 62a designates a flange portion provided to the rotating cylinder 62, and by bringing the flange portion 62a into contact with the holder member 61 provided thereabove, the rotating cylinder 62 can be restricted from being moved to an upper side by a constant amount or more.

By providing the third spring member 111 between the recess chuck portion 63 on the jig base 52L, when a force is exerted to the recess chuck portion 63 to a lower side in the axial direction, the rotating cylinder 62 can be moved to the lower side against a force of the third spring member 111. In addition thereto, by applying a torque of rotating the recess chuck portion 63, the rotating cylinder 62 can be rotated.

Referring back to FIG. 7, the screw fastening jig 50 includes the holder member 61 attached to the jig base 52L, the rotating cylinder 62 fitted to the holder member 61 and having the spiral groove 81 at a surrounding thereof, the rotating shaft 64 fitted to the rotating cylinder 62 and having the pin 82, and the second spring member 75 for urging the rotating shaft 64. Further, by moving the slider 94 relative to the cylindrical holder 92, the cylindrical member 71 is moved rearward and forward, and by moving the pin 82 along the spiral groove 81, the front end portion 71t of the cylindrical member 71 is moved forward and rearward and turned along with the driver bit 66 relative to the holder member 61.

Figure 8:
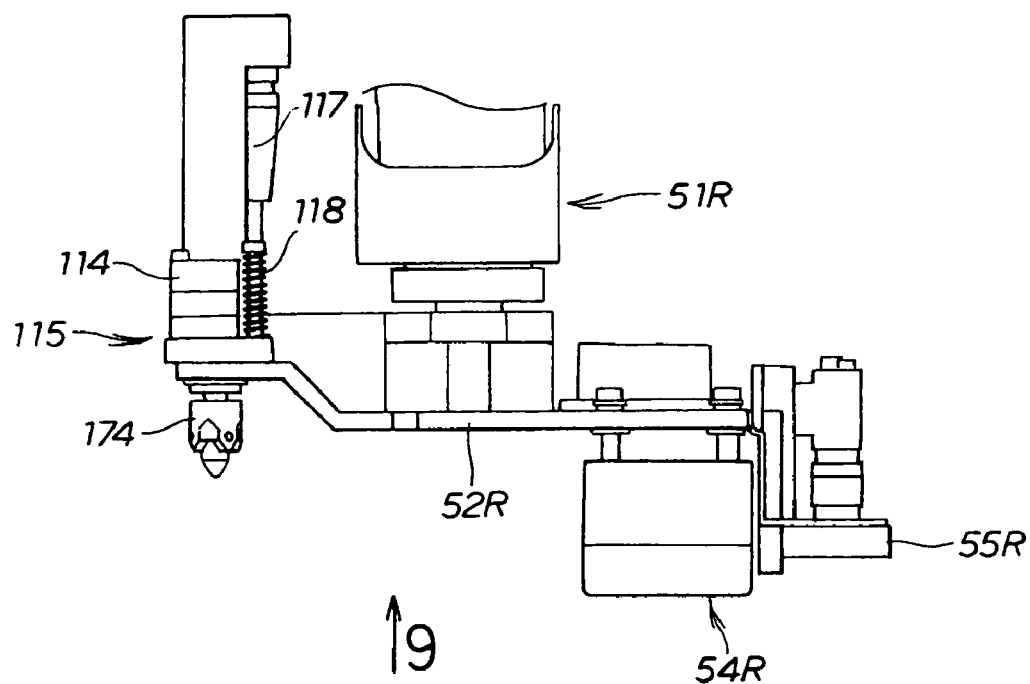
FIG. 8 is a side view of the jig base including a screw fastening drive portion.

FIG. 8 is a side view of the jig base including a screw fastening drive portion, the front end portion of the robot arm 51R is attached with the jig base 52R, the jig base 52R is mounted with a screw fastening drive portion 115 including screw fastening drive means 114 and the jig base 52R is mounted with the press pad 54R as member moving means 45.

The jig fastening drive portion 115 includes screw fastening drive means 114 and by the screw fastening drive means 114, the driver bit provided to the screw fastening jig (notation 50 of FIG. 7) is applied with predetermined torque and predetermined force.

Further, the screw fastening drive portion 115 includes a cylinder unit 117 and a spring 118 and serves to feed the screw made to face a work forward and fasten the screw by the screw fastening drive portion 115.

The press pad 54R integrates the door trim to a predetermined position of the door panel (notation 18 of FIG. 3) constituting the integrated work by exerting a force to the door trim (notation 16 of FIG. 3) constituting the integrating work by a predetermined force before fastening the screw to the work.

That is, by the press pad 54R, the first member 15 (door trim 16) is moved to the second member 17 (door panel 18).

In addition thereto, there is provided reaction force detecting means, not illustrated, provided at the press pad 54R for detecting a press reaction force generated when the door trim 16 is matched to the door panel 18.

Figure 9:
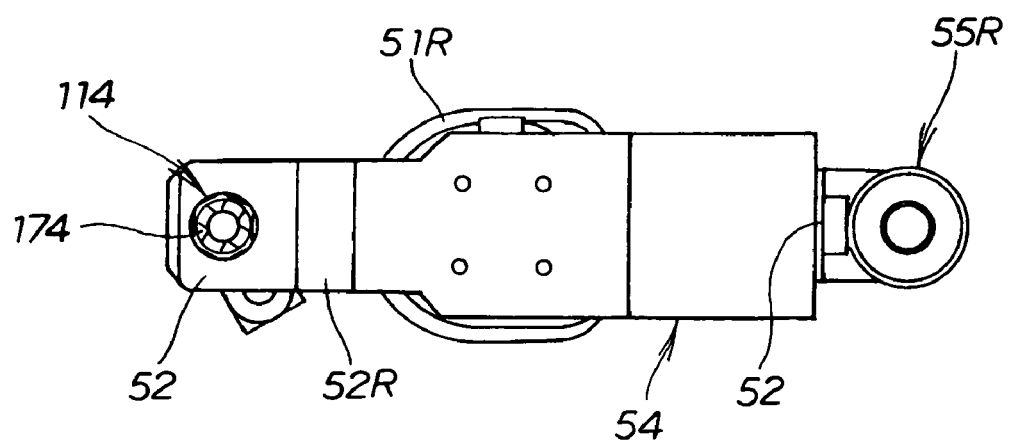
FIG. 9 is a view taken from 9 arrow mark of FIG. 8.

FIG. 9 is a 9 arrow mark view of FIG. 8, the jig base 52R is extended from the front end portion of the robot arm 51R, and the screw fastening drive means 114 is attached to left end 52m of the jig base 52R. Further, the press pad 54R is attached to a right end 52r of the jig base 52R. Notation 55R designates a CCD camera unit for recognizing the position of the work.

Figure 10:
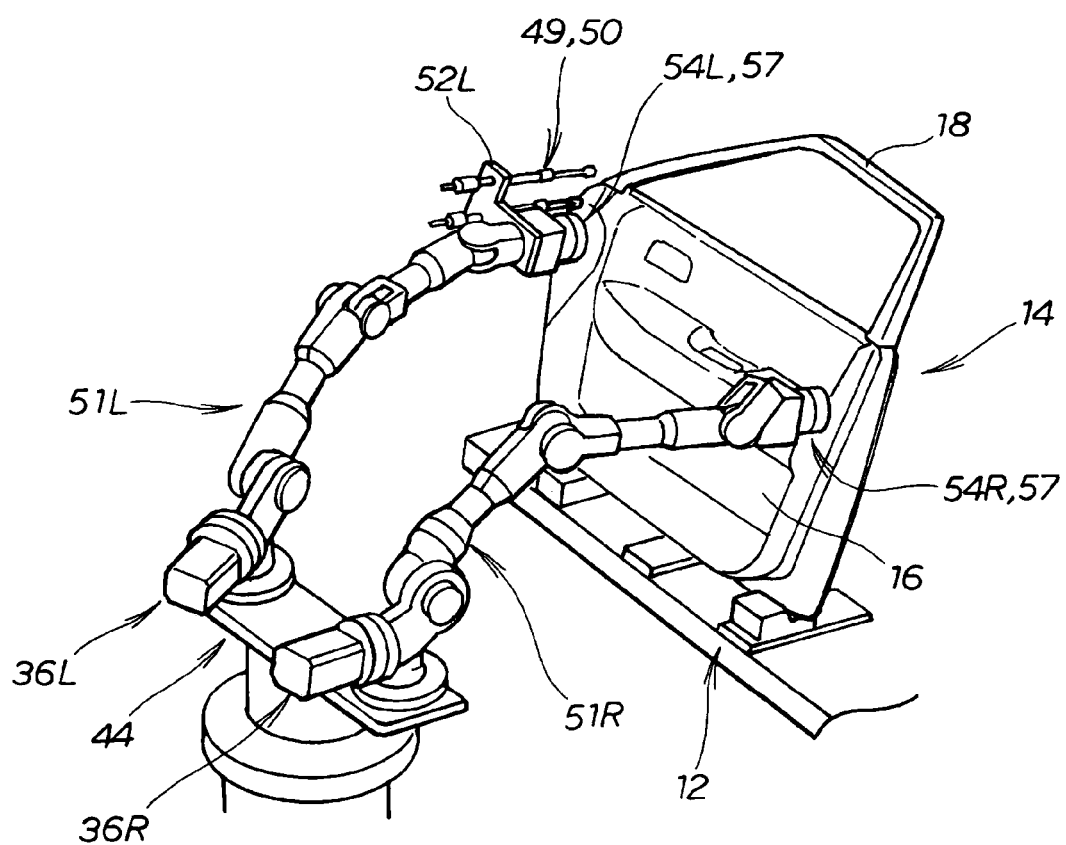
FIG. 10 is a view enlarging a 10 portion of FIG. 3.

FIG. 10 is a view enlarging a 10 portion of FIG. 3, the left articulated robot 36L is constituted by the robot arm 51L freely moved at surrounding of the work, the work pressing means 57 having the press pad 54L for pressing the work, the reaction force detecting means, not illustrated, provided to the work pressing means 57 for detecting the reaction force exerted to the work pressing means 57, and the screw fastening jig 50 constituting one of screw fastening means 49.

Further, the right articulated robot 36R includes the robot arm 51R moved freely at the surround of the work, the work pressing means 57 provided with the press pad 54R for pressing the work, and the reaction force detecting means, not illustrated, provided to the work pressing means 57 for detecting the reaction force exerted to the work pressing means 57. Further, the front end portion of the robot arm 51R is provided with the screw fastening drive portion (notation 115 of FIG. 8).

The screw fastening means 49 comprises the screw fastening jig 50 provided at the front end portion of the left robot arm 51L, and the screw fastening drive portion 115 provided at the front end portion of the right robot arm 51R, which are dividedly provided to the two robot arms 51L, 51R.

Figure 11:
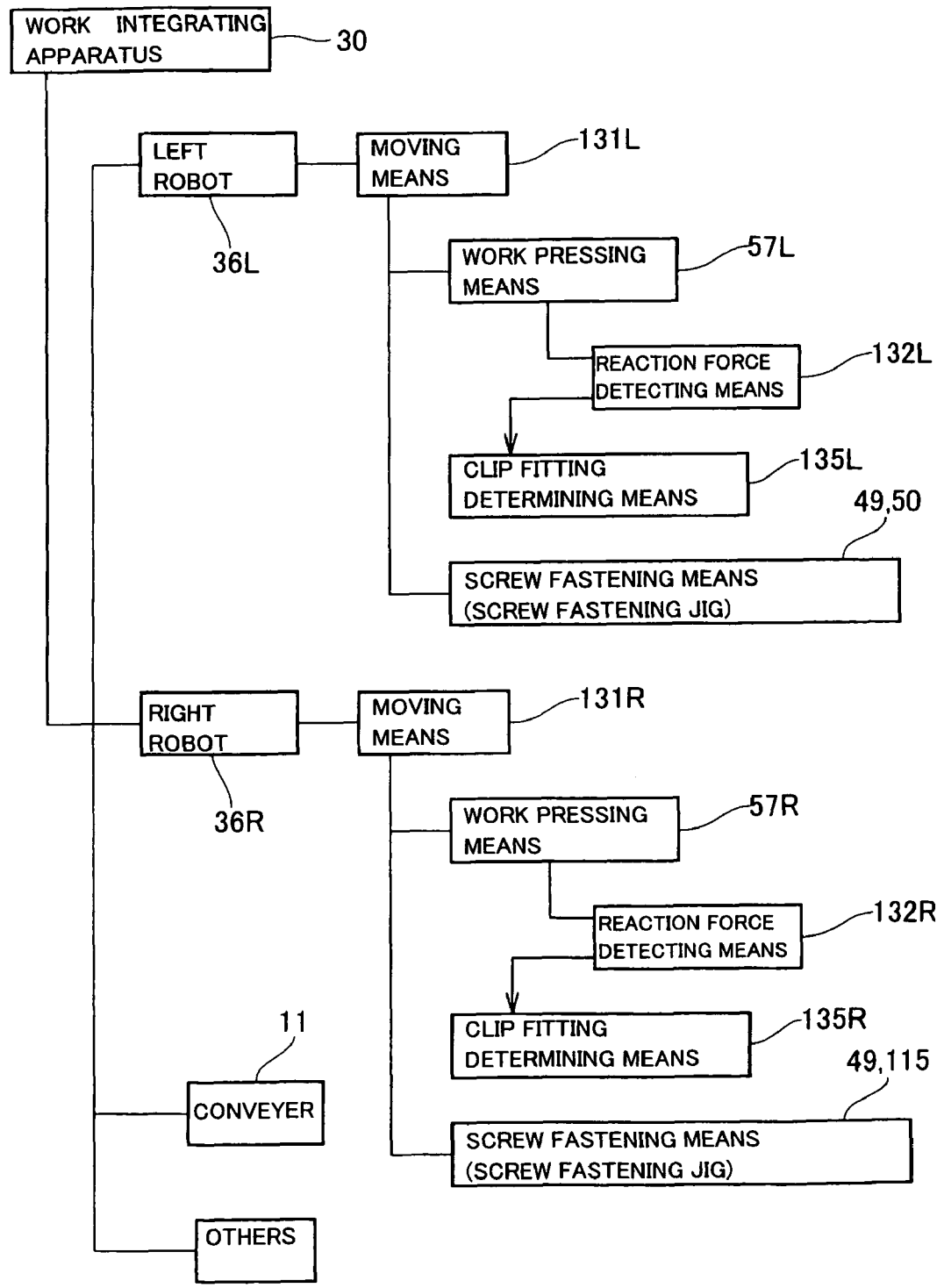
FIG. 11 is a block diagram of the apparatus of integrating the works.

FIG. 11 is a block diagram of the apparatus of integrating the work, the apparatus 30 of integrating the work includes the robots 36L, 36R constituting moving means 131L, 131R freely movable at a surrounding of the work, includes the work pressing means 57L, 57R for pressing the integrating work to the integrated work at the robots 36L, 36R, includes the reaction detecting means 132L, 132R for detecting the reaction forces exerted to the work pressing means 57L, 57R, includes clip fitting determining means 135L, 135R for determining the clip coupling portion (notation 41 of FIG. 2) to be normal or abnormal by the detected reaction forces of the pressure detecting means 132L, 132R, and includes the screw fastening means 49 for fastening the screw (notation 84 of FIG. 2) to the screw coupling portion (notation 42 of FIG. 2)

in which a coupling state of the clip coupling portion 41 is determined to be normal by the clip fitting determining means 135L, 135R.

FIGS. 12(a) to 12(c) illustrate operation views for explaining that the clip provided on the side of the first member is fitted to the second member, showing that a predetermined portion of the door trim 16 or a portion of the clip 37 is pressed in an arrow mark y direction by the press pad 54.

FIG. 12(a) shows the clip 37 in the preparing step (notation 21 of FIG. 1) and the door trim 16 is made to face the door panel 18 in a state of being attached with a base portion 141 of the clip 37.

FIGS. 12(b) and 12(c) show the clip 37 in the clip fitting step (notation 24 of FIG. 1), and by pressing the clip 37 provided on the side of the door trim 16 in the arrow mark y direction by the press pad 54, the clip 37 is fitted to the clip hole 38 provided to the door panel 18.

In FIG. 12(b), the clip 37 sharpens a front end portion 37a thereof, provided with a barrel portion 143 formed to be gradually bold rearward from the front end portion 37a, and provided with a fitting portion 144 fitted to the clip hole 38 at a rear portion 37b thereof. Therefore, by a pressing force by the press pad 54, in inserting the clip, the barrel portion 143 of the clip 37 is made to be elongatable and contractable in a direction substantially orthogonal to an inserting direction.

In FIG. 12(c), the rear portion 37b of the clip 37 is provided with the fitting portion 144 for fitting the clip hole 38 and the clip 37. Further, a boldness of the fitting portion 144 is normally smaller than a maximum boldness of the barrel portion 143.

When the first member 15 is further pressed in the direction of the arrow mark y by the press pad 54, fitting is finished by making the fitting portion 144 reach the clip hole 38 provided to the second member 17.

At a moment at which the fitting portion 144 is fitted to the clip hole 38, the boldness of the fitting portion 144 is smaller than the maximum boldness of the barrel portion 143. Therefore, the contracted barrel portion 143 is released to return to a direction of an arrow mark z constituting the original position to thereby finish sitting. The clip 37 includes a spacer element 220 positioned between the first member and the second member, as shown in FIG. 12(c).

Figure 13:
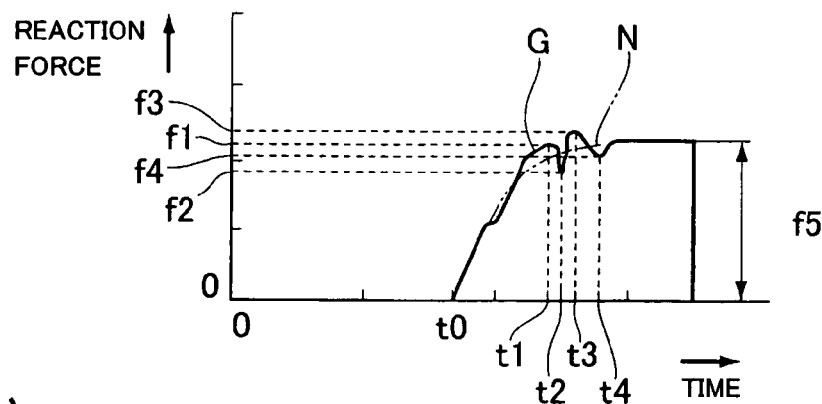
FIG. 13 is an operation explanatory diagram for explaining a change over time of a press reaction force when the clip is fitted to a clip hole.

FIG. 13 is an operation explanatory diagram for explaining a change over time of the press reaction force when the clip is fitted to the clip hole, showing a characteristic of the press reaction force when a number of the clip is one.

Curve G is a curve showing a characteristic of press reaction force when the clip (notation 37 of FIGS. 12(a) to 12(c)) is normally fitted to the clip hole (notation 38 of FIGS. 12(a) to 12(c)), and curve N is a curve showing a characteristic of the press reaction force when the clip (notation 37 of FIGS. 12(a) to 12(c)) is not attached to the door trim (notation 16 of FIGS. 12(a) to 12(c)).

With regard to curve G, at time t0, the press pad is brought into contact with the door trim 16 to start pressing, exerted with the press reaction force as a reaction force thereof to be detected by the reaction force detecting means, becomes f1 constituting a first peak value of the press reaction force at time t1, becomes f2 by reducing the press reaction force at time t2, becomes f3 constituting a second peak value of the press reaction force at time t3, becomes f4 by reducing the press reaction force at time t4, and finally becomes f5 constituting a steady state value. Further, the time period t0 through t4 is around 300 ms.

A value (f1-f2) of reducing the reaction force brought about during a time period of t1 through t2 and a value (f3-f4) of reducing the reaction force brought about during a time period of t3 through t4 are respectively values brought about when the fitting portion 144 of the clip 37 reaches the clip hole 38, and the reason of reducing the reaction force is that at a moment at which the inserting portion main body is brought into the clip hole and the fitting portion 144 reaches the clip hole 38 to be fitted therewith by pressing, the barrel portion 142 is released. At this occasion, an accumulated value Xm of reducing the press reaction force becomes ((f1-f2)+(f3-f4)).

With regard to curve N, when the clip 37 is not attached to the door trim 16, the press reaction force is continuously increased, and reaches the steady state value f5 with an elapse of time. At this occasion, the reduction in the press reaction force is null and the accumulated value of reducing the press reaction force is null.

Figure 14A:
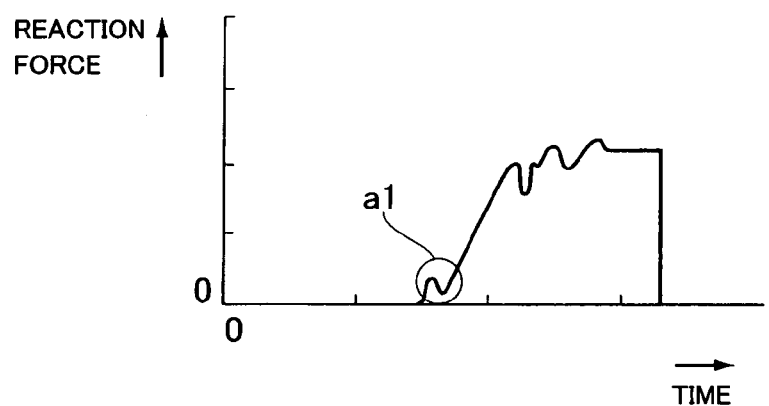
FIG. 14(a) illustrates an operation explanatory diagram for explaining a change over time of the press reaction force when the clip is not normally fitted to the second member, in which the clip is deviatedly brought into the clip hole.
Figure 14B:
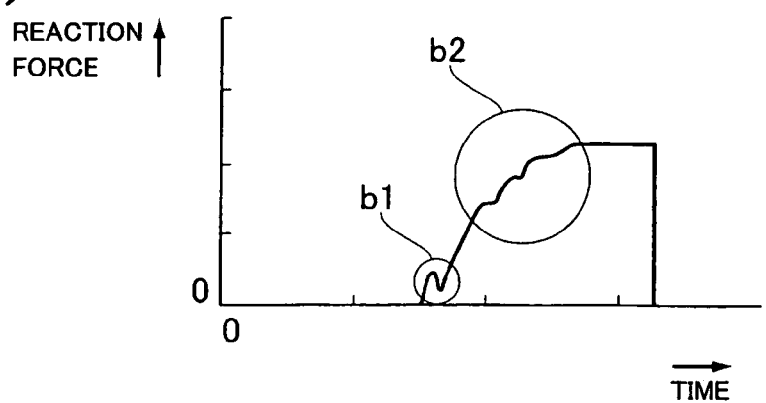
FIG. 14(b) illustrates an operation explanatory diagram for explaining the change over time of the press reaction force when the clip is not normally fitted to the second member, in which the clip cannot be brought into the clip hole by being deviated therefrom.

FIGS. 14(a) and 14(b) illustrate operation explanatory views for explaining changes over time of the press reaction force when the clip is not normally fitted to the second member.

In FIG. 14(a), there is shown a characteristic of the press reaction force when the clip (notation 37 of FIGS. 12(a) to 12(c)) is deviatedly brought into the clip hole (notation 38 of FIGS. 12(a) to 12(c)).

A reduction in the reaction force at a1 region of the drawing is caused by the fact that the barrel portion (notation 143 of FIGS. 12(a) to 12(c)) is brought into partial contact with the clip hole immediately after starting to insert the clip into the clip hole. In addition to the reduction in the reaction force, as shown by the preceding drawing, the reaction force when the clip is fitted to the fitting portion is added and therefore, in comparison with the accumulated value Xm of the reduction in the press reaction force when normally fitted, an accumulated value Xa of the reduction in the press reaction force is increased. Therefore, Xm<Xa.

In FIG. 14(b), there is shown a characteristic of the press reaction force when the clip (notation 37 of FIGS. 12(a) to 12(c)) cannot be brought into the clip hole (notation 38 of FIGS. 12(a) to 12(c)) by being deviated therefrom.

A reduction in the reaction force at b1 region of the drawing is caused by the fact that after the barrel portion 143 is brought into partial contact with the clip hole immediately after starting to insert the clip into the clip hole, the barrel portion 143 is released. Further, a reduction in the press reaction force is not observed at b2 region because the fitting portion (notation 144 of FIGS. 12(a) to 12(c)) does not reach the clip hole 38. Therefore, in comparison with normal fitting, an accumulated value Xb of the reduction in the press reaction force is reduced and Xb<Xm.

Although an explanation has been given of the fact that the accumulated value for reduction in the press reaction force is changed by a failure in a position of setting the clip, the accumulated value of the reduction in the press reaction force is significantly varied also by a failure in the clip per se, a difference in specification, a positional shift, a difference in a size of the clip hole or the like.

Therefore, it can be determined whether the clip is correctly fitted (hereinafter, referred to also as acceptability of fitting) by a value of an accumulated value X by grasping the accumulated value X of the reduction in the press reaction force in pressing by taking these factors into consideration.

Specifically, the acceptability of fitting can be determined by setting an allowable range of accumulated value X of the reduction in the press reaction force to, for example, Xmin<X<Xmax. That is, when X is a value smaller than Xmin, it is determined that the clip is not correctly fitted, and when X is a value larger than Xmax, it is determined that the clip is not correctly fitted.

Xmin and Xmax are values capable of being set by experiment and experience.

Although an explanation has been given of the change over time of the press reaction force when the number of the clips is one in the drawings, in the embodiment, the number of the clip is eight.

Hence, a specific explanation will be given of the number of the clips and position of pressing the clip by the press pad.

Referring back to FIG. 2, notations 146a through 146d designate positions of pressing the door trim 16 by the left and right press pads 54L, 54R when the door trim 16 is integrated to the door panel 18.

According to the exemplary embodiment, the number of clips corresponding to the single press pad per one time pressing is two and the press reaction forces are detected by two times pressing operation of the respective press pads.

The left and right clips are simultaneously pressed by a way of thinking similar to that in a case in which when the number of the clip is one, a vicinity of the clip is pressed by the press pad attached to the front end of the articulated robot, and the acceptability of fitting the clips can be determined even when the number of clips corresponding to the single pad per one time pressing is two.

When the number of the clips is two, a characteristic of the reaction force is grasped by the reaction force detecting means 132, based on the characteristic of the reaction force, Xmin, Xmax are set, and the values are provided to the clip determining means 135L, 135R for determining the fitting of the clip.

That is, in the clip fitting step 24, the press reaction force when the first member 15 is pressed to the second member 17 is detected, and based on the change in the press reaction force, it is determined whether the clip 37 is correctly fitted.

Referring back to FIG. 10, in the clip fitting step 24, there are detected the press reaction forces when the door trim 16 constituting the first member 15 is pressed by the press pads 54L, 54R provided at the front end portions of the two left and right articulated robots 36L, 36R, based on the changes in the press reaction forces, it is determined whether the clip (notation 37 of FIG. 2) is correctly fitted and therefore, in coupling the first member and the second member by the clip and the screw, confirmation of attaching the clip can be automated, a burden on the operator can be alleviated, and reliability of confirmation of mounting can be promoted.

Further, the press reaction force can be detected by an inexpensive pressure sensor, the change in the press force can be determined by an inexpensive control portion and therefore, the exemplary embodiment can be embodied by inexpensive cost.

When it is determined that the clip (notation 37 of FIG. 2) is correctly fitted, the screw is fastened. Hence, operation of screw fastening means will be described as follows.

In the screw fastening step 23, when the fitting is determined to be acceptable by the clip fitting determining means, the screw 84 for connecting the first member 15 to the second member 17 is fastened.

FIGS. 15(a) to 15(e) illustrate operation views for explaining to bring the front end potion of the cylindrical member into contact with the head of the screw, and an explanation will be given of the fact that the screw provided to a screw pressing portion 171 is adsorbed to be held by the screw adsorbing and holding mechanism 70 provided to the screw fastening jig 50.

In FIG. 15(a), the screw fastening jig 50 attached to the front end portion of the robot arm 51 is made to face the screw 84 arranged at the screw pressing portion 171. Specifically, the front end portion 71t of the cylindrical member 71 is made to be proximate to the head 84t of the screw.

In FIG. 15(b), the screw fastening jig 50 is moved in arrow mark S direction further from the position of FIG. 15(a) to be proximate to the screw 84 and the front end portion 71t of the cylindrical member 71 is brought into contact with the head 84t of the screw.

FIG. 15(c) is a sectional view enlarging the portion of FIG. 15(b) showing that although the front end portion 71t of the cylindrical member 71 is brought into contact with the head 84t of the screw, the front end portion 66t of the driver bit 66 is not brought into contact with the head 84t of the screw.

In FIG. 15(d), the screw fastening jig 50 is moved in the arrow mark S direction further from the position of FIG. 15(b), the screw fastening jig 50 is made to be proximate to the screw 84, and the front end portion 66t of the driver bit 66 is brought into contact with the head 84t of the screw.

FIG. 15(e) is the sectional view enlarging the portion of FIG. 15(d), showing that the front end portion 66t of the driver bit 66 is brought into contact with the head 84t of the screw.

FIGS. 16(a) and 16(b) illustrate operation views for explaining the fact that the driver bit is brought in mesh with the head of the screw, and the driver bit 66 is brought in mesh with the fastening groove 84m formed at the head 84t of the screw by the rotating shaft turning mechanism 80.

In FIG. 16(a), although there is brought about a state in which the front end portion 66t of the driver bit 66 is brought into contact with the head 84t of the screw, since the reaction force is not exerted to the front end portion 66t of the driver bit 66, the rotating shaft 64 is not turned.

In FIG. 16(b), in the state in which the front end portion 66t of the driver bit 66 is brought into contact with the head 84t of the screw, when the screw fastening jig 50 is moved further in the arrow mark S direction by a displacement y to make the screw fastening jig 50 proximate to the screw 84, the rotating shaft 64 is moved rearward relative to the rotating cylinder 62, the rotating shaft 64 is turned along the spiral groove 81 provided at the rotating cylinder 62 and the driver bit 66 is turned by turning the rotating shaft 64.

By turning the driver bit 66, the front end portion 66t of the driver bit 66 can be brought in mesh with the fastening groove 84m of the screw.

In this way, the screw fastening jig 50 is provided with the rotating shaft turning mechanism 80 for rotating the rotating shaft 64 relative to the rotating cylinder 62 by operating the rotating shaft 64 to move rearward relative to the rotating cylinder 62 between the rotating cylinder 62 and the rotating shaft 64 and therefore, it is possible to fit the front end portion 66t of the driver bit 66 to the fastening groove 84m of the screw by moving the jig base 52 including the rotating cylinder 62 forward in the axial direction, bringing the front end portion 66t of the driver bit 66 integral with the rotating shaft 64 into contact with the fastening groove 84m of the screw, further moving the jig base 52 forward in the axial direction and rotating the driver bit 66.

Further, since there is provided the rotating shaft turning mechanism 80 for rotating the rotating shaft 64 when the rotating shaft 64 is moved rearward relative to the rotating cylinder 62 in the axial direction, driving means by power of, for example, a motor or the like is dispensed with for rotating the driver bit 66.

The rotating shaft 64 can be turned without using driving means by power, and the front end portion 66t of the driver bit 66 can smoothly be fitted to the fastening groove 84m of the screw.

In addition thereto, energy saving formation can be achieved since driving means by power is not used.

Figure 17:
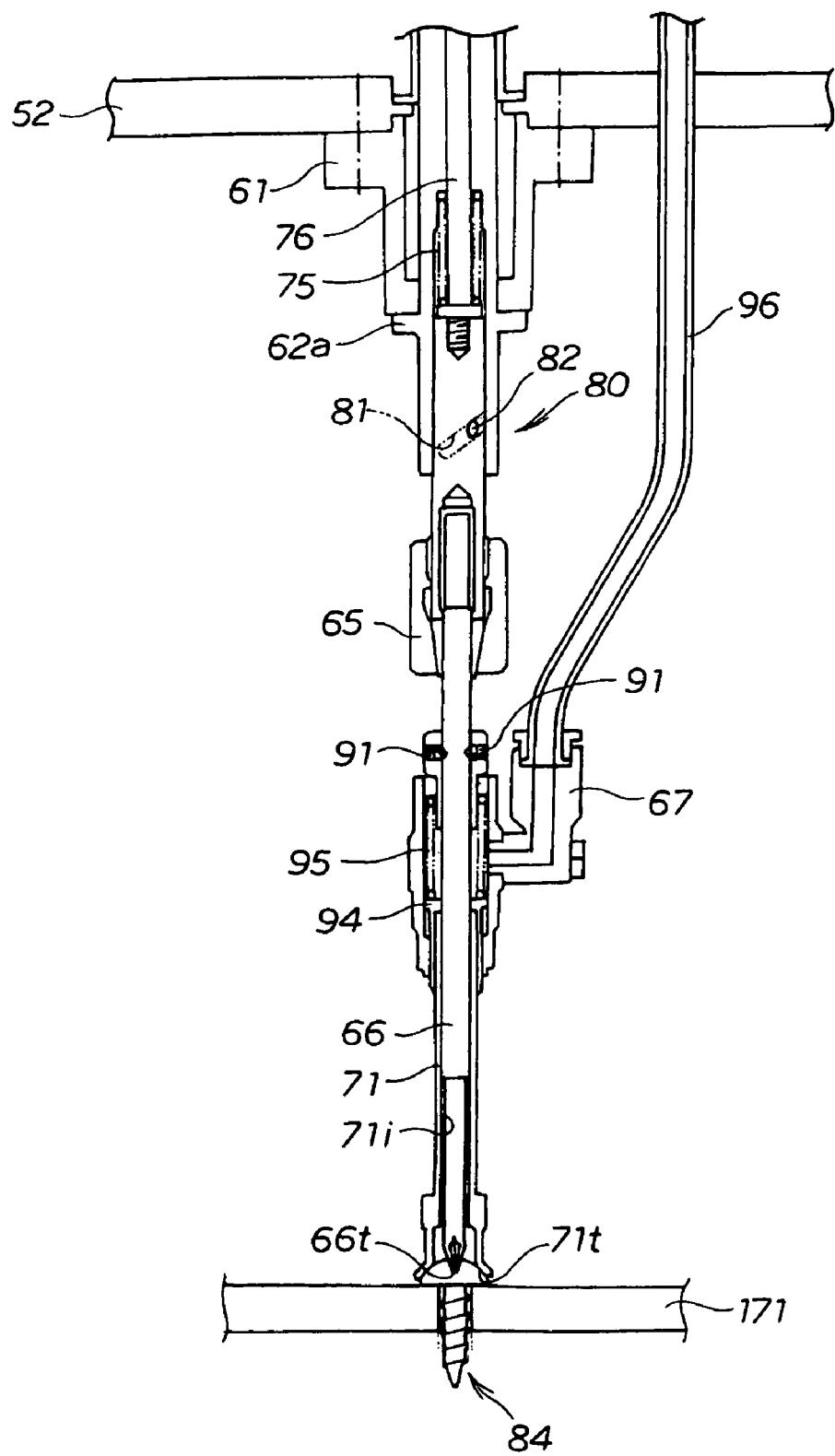
FIG. 17 is an operation view showing that the driver bit is brought in mesh with the head of the screw.

FIG. 17 is an operation view showing that the driver bit is brought in mesh with the head of the screw, by bringing the front end portion 71t of the cylindrical member 71 into contact with the head 84t of the screw prepared at the screw pressing portion 171, bringing the driver bit 66 in mesh therewith, successively, reducing a pressure of an inner portion 71i of the cylindrical member 71, the screw can be adsorbed to be held thereby.

Thereafter, the screw fastening jig 50 adsorbing to hold the screw 84 is moved to face the work.

Here, although when the screw is lifted from the screw pressing portion 171 while the screw 84 is adsorbed to be held thereby, the first spring member 95 is elongated, the front end portion 66t of the driver bit 66 is separated from the fastening groove 84m of the screw, the second spring member 75 provided to the rotating shaft turning mechanism 80 is elongated, the rotating shaft 64 is turned and therefore, temporarily, a phase between a position of the fastening groove 84m of the screw and a position of the front end portion 66t of the driver bit 66 is shifted, when the front end portion of the cylindrical member 71 is brought into contact with the work to start fastening, again, the rotating shaft 64 and the front end portion 66t of the driver bit 66 rotated integrally with the rotating shaft 64 are rotated up to a position at which the front end portion 66t is brought in mesh with the fastening groove 84m of the screw and therefore, the front end portion 66t of the driver bit 66 and the fastening groove 84m of the screw coincide with each other.

Figure 18A:
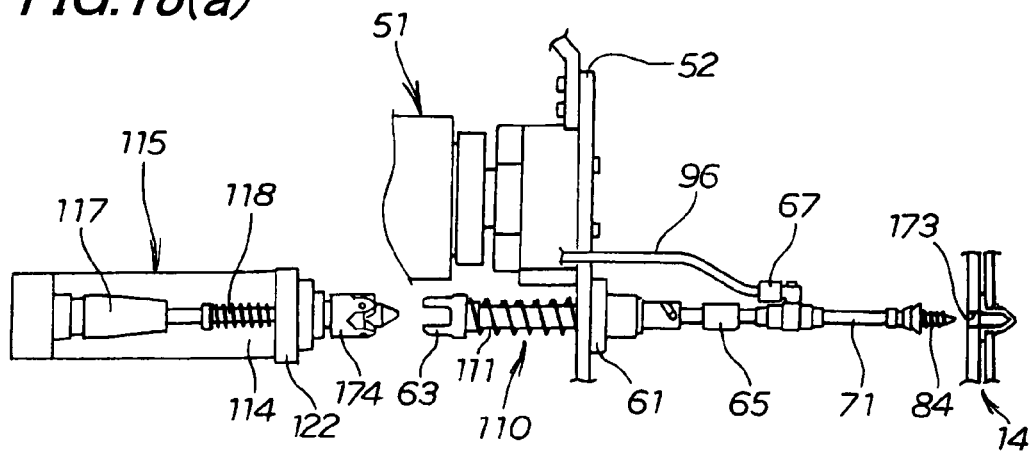
FIG. 18(a) illustrates an operation view for explaining that the screw fastening jig adsorbing the screw is made to face a predetermined position of the work.
Figure 18B:
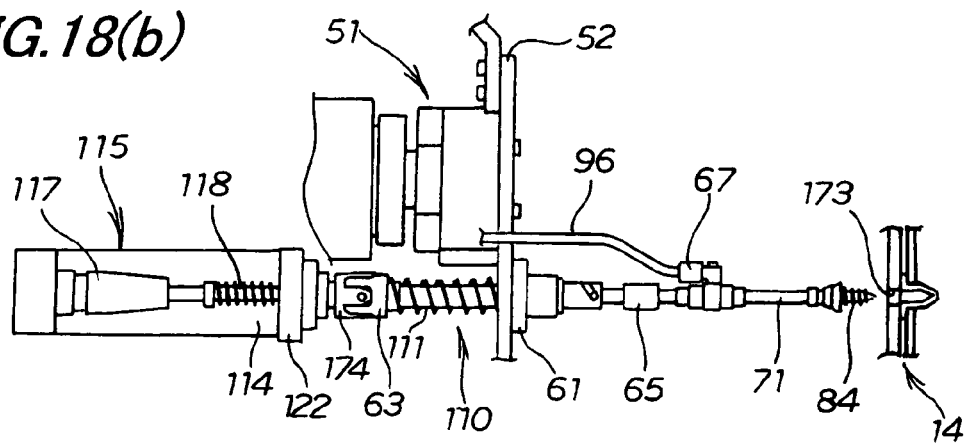
FIG. 18(b) illustrates the operation view for explaining that the screw fastening drive portion is mounted to the screw fastening jig.
Figure 18C:
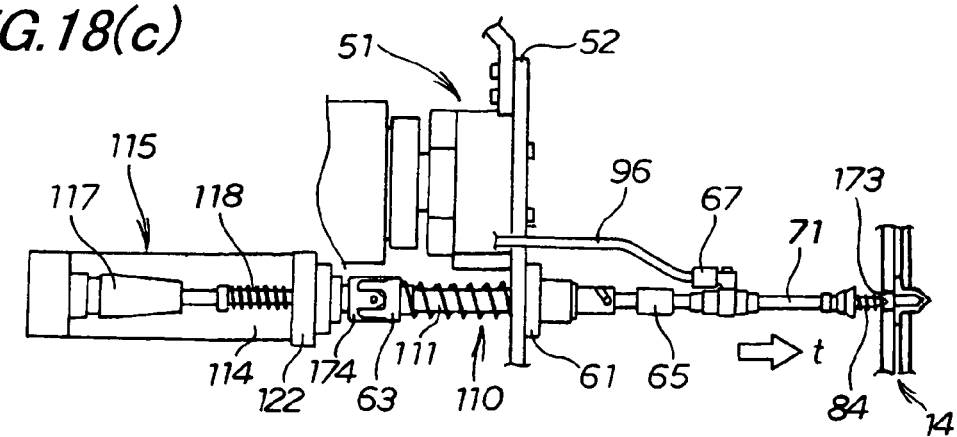
FIG. 18(c) illustrates the operation view for explaining that the screw is fastened to the work by a mechanism of rotating and feeding a rotating cylinder.

FIGS. 18(a) to 18(c) is an operation view for explaining the fact that the screw fastening jig adsorbing the screw is made to face a predetermined position of the work, the screw fastening drive portion is mounted to the screw fastening jig and the screw is fastened to the work 14 by the mechanism of rotating and feeding the rotating cylinder.

In FIG. 18(a), previously, the screw fastening jig 50 adsorbing the screw is made to face a fastening hole 173 on the work 14. Further, the screw fastening drive portion 115 is made to be proximate to the screw fastening jig 50. Specifically, a projected chuck portion 174 is made to be proximate to the recess chuck portion 63.

In FIG. 18(b), the projected chuck portion 174 is connected to the recess chuck portion 63.

In FIG. 18(c), the screw fastening drive portion 115 and the screw fastening jig 50 which are integrated are made to be further proximate to the fastening hole 173 of the work, the screw fastening drive means 114 is rotated, and feeding means 116 is fed in an arrow mark t direction to fasten the screw to the fastening hole of the work 14.

That is, the screw fastening jig 50 is used in a series of operation of adsorbing to hold the screw 84 by reducing the pressure at inside of the cylindrical member 71, moving the screw 84 from the screw pressing portion to the work 14 under the state to face the predetermined position of the work 14 and fastening the screw 84 to the work 14 by rotating the rotating cylinder 62, and the screw fastening drive portion 115 is attached to the screw fastening jig 50 for supplying power necessary for fastening the screw.

Figure 19:
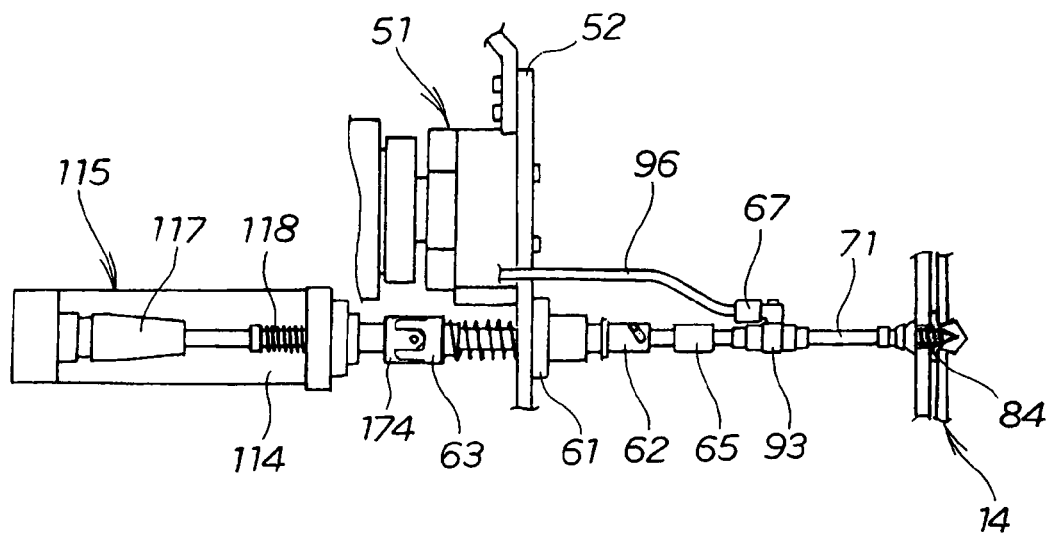
FIG. 19 is an operation view for explaining that the screw adsorbed to the screw fastening jig is fastened to the work by the fastening drive portion.

FIG. 19 is an operation view for explaining the fact that the screw adsorbed to the screw fastening jig is fastened to the work by the fastening drive portion, showing that fastening of the screw 84 is finished.

One cycle of fastening is finished by fastening the screw 84 to the work 14, thereafter, first, returning the projected chuck portion 174 of the screw fastening drive portion 115, thereafter, separating the screw fastening drive portion 115 from the screw fastening jig 50, successively, separating the screw fastening jig 50 from the screw 84.

Figure 20:
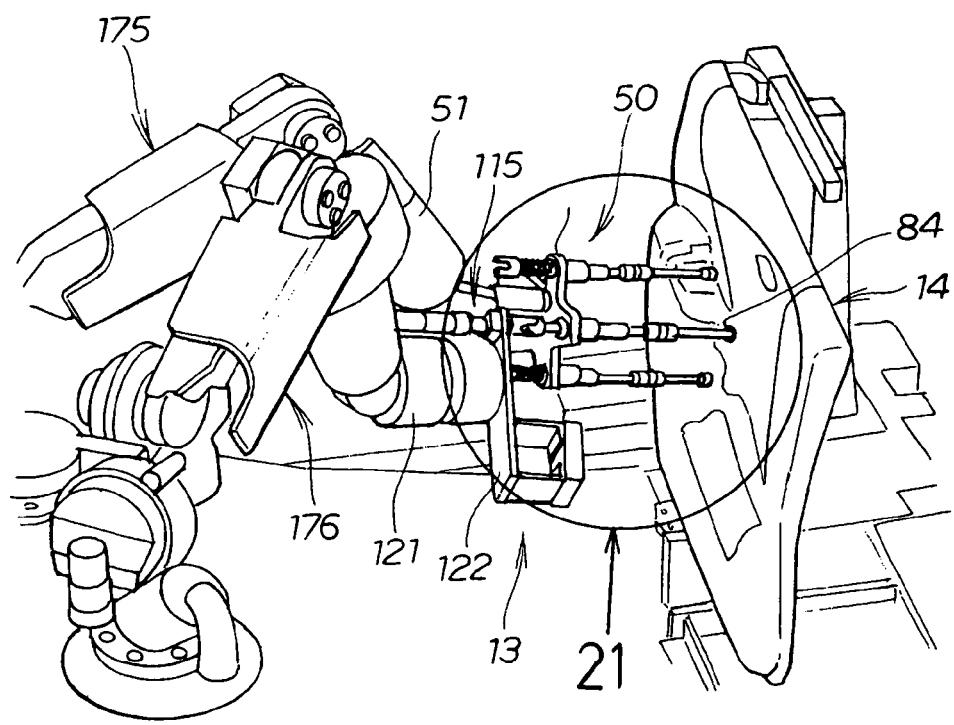
FIG. 20 is a view for explaining an actual screw fastening operation.

FIG. 20 is a view for explaining actual screw fastening operation, and the screw fastening jig 50 is attached to the front end portion of the robot arm 51 provided to the one articulated robot 175 by way of the jig base 52. The screw is adsorbed to the screw fastening jig 50. It is shown that the screw 84 is fastened to the work 14 by combining the screw fastening jig 50 provided to the one articulated robot 175 and the screw fastening drive portion 115 attached to the front end portion of the robot arm 121 provided to the other articulated robot 176 by way of the jig base 52.

Figure 21:
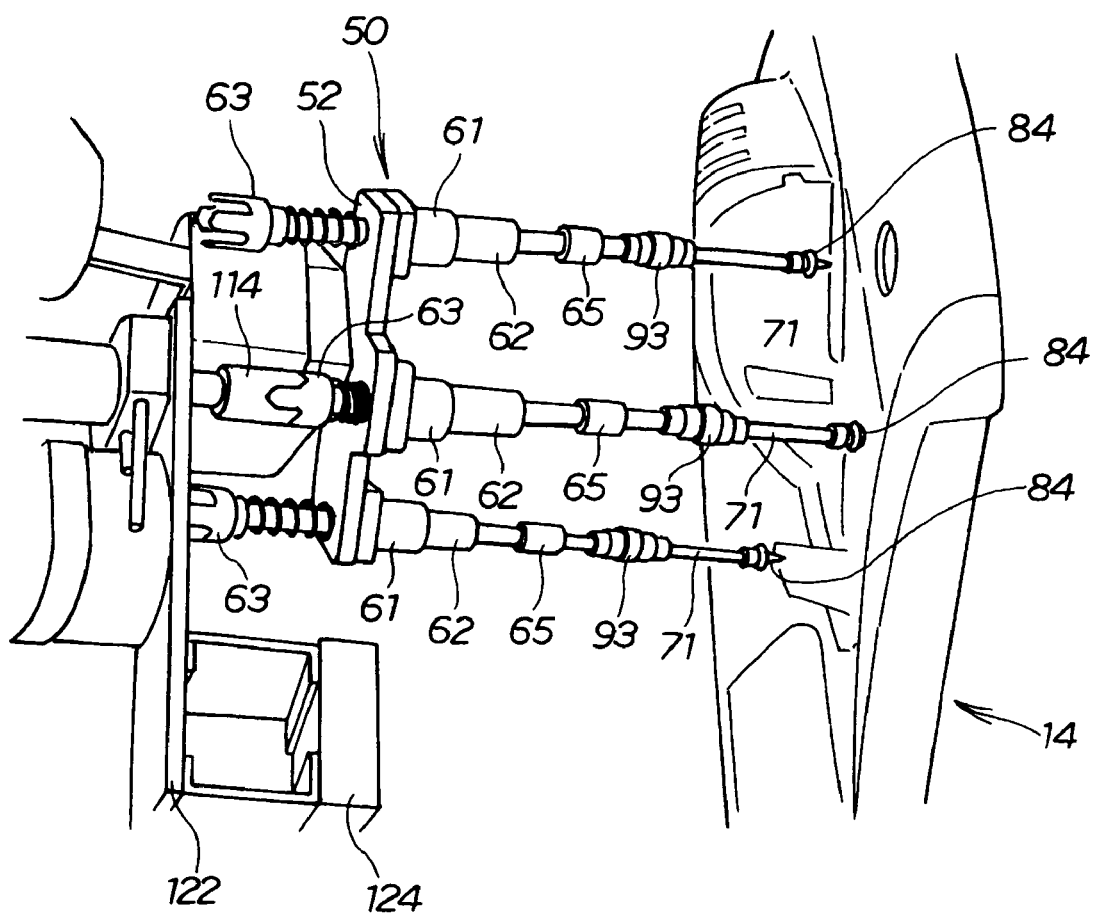
FIG. 21 is a view enlarging a 21 portion of FIG. 20.
Figure 22:
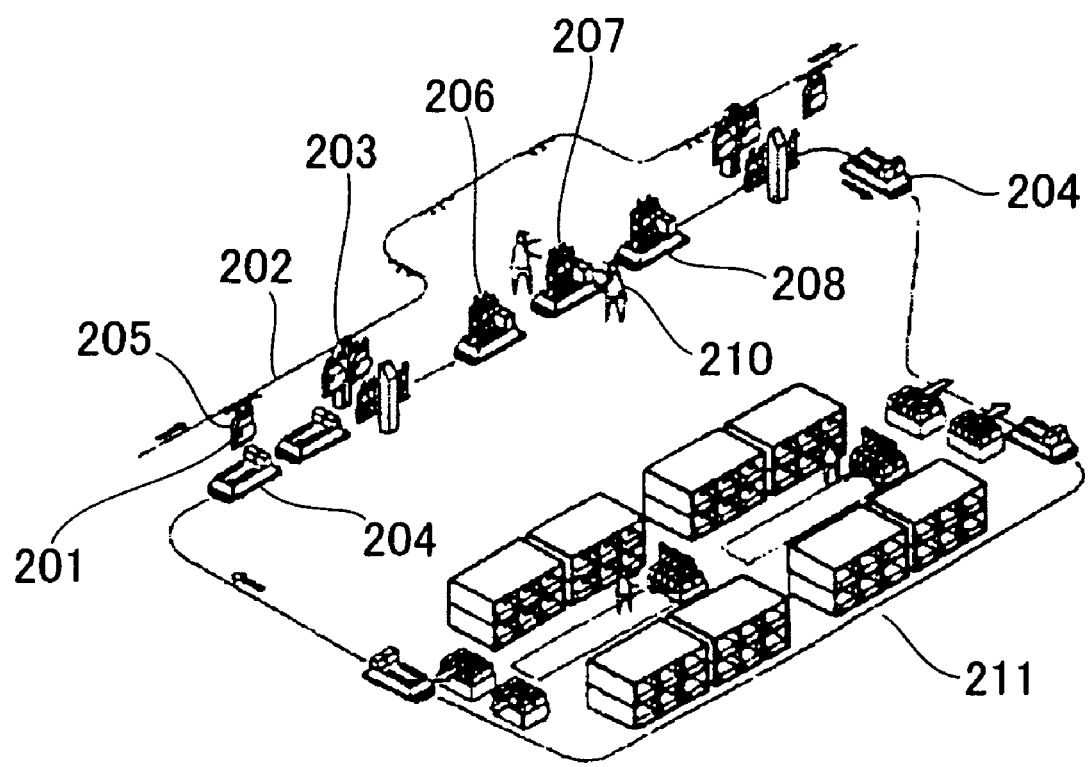
FIG. 22 is a view for explaining a basic constitution of a background art.

FIG. 21 is a view enlarging 21 portion of FIG. 20, and the fastening operation can automatically be carried out by bringing the projected chuck portion 174 of the screw fastening drive portion 115 in mesh with one recess chuck portion 63 of a plurality of the recess chuck portions 63 . . . adsorbing the screws 84 . . . provided to the screw fastening jig 50. After finishing to fasten one screw 84, operation of fastening the screws 84 . . . can be carried out fully automatically by successively bringing the projected chuck portion 174 to the recess chuck portions 63, 63 in correspondence with remaining screws 84 . . . .

Further, although the invention is applied to assembling an automobile according to the exemplary embodiment, the invention is not limited to assembling an automobile but applicable widely in assembling a general mass-produced product.

It will be apparent to those skilled in the art that various modifications and variations can be made to the described exemplary embodiments of the invention without departing from the spirit or scope of the invention. Thus, it is intended that the present invention cover all modifications and variations of this invention consistent with the scope of the appended claims and their equivalents.

What is claimed is:

1. A method of coupling a first member and a second member by a clip and a screw, the method comprising:
   a preparing step of making the first member to face the second member in a state of attaching a base portion of a clip to the first member, wherein the first member has a first side and a second side, wherein the clip includes a barrel portion, wherein the base portion of the clip is on the first side of the first member and the barrel portion is on the second side of the first member;
   a clip fitting step of fitting the clip to a clip hole on the second member by a press pad directly pressing the base portion toward the second member with the barrel portion penetrating the clip hole on the second member, wherein the clip includes a spacer element positioned between the first and second members in the clip fitting step;
   a screw fastening step of connecting the first member to the second member by the screw;
   detecting a reduction of a press reaction force when the first member is pressed to the second member;
   comparing an accumulated value of the reduction of the press reaction force with a predetermined range between a lower limit and an upper limit; and
   determining whether the clip is correctly fitted in dependence upon said comparing.

2. A method of coupling a first member and a second member by a clip and a screw, the method comprising:
   a preparing step of making the first member to face the second member in a state of attaching a base portion of a clip to the first member, wherein the first member has a first side and a second side, wherein the clip includes a barrel portion, wherein the base portion of the clip is on the first side of the first member and the barrel portion is on the second side of the first member, wherein the barrel portion penetrates a clip hole on the second member in the preparing step;

a clip fitting step of fitting the clip to the clip hole on the second member by a press pad directly pressing the base portion toward the second member, wherein the clip fitting step includes a first step of the press pad pressing the base portion toward the second member with the barrel portion being contracted in a direction substantially orthogonal to an inserting direction and includes a second step of finishing the fitting of the clip to the clip hole with the contracted barrel portion being released to return to the original shape; and a screw fastening step of connecting the first member to the second member by the screw;

detecting a reduction of a press reaction force when the first member is pressed to the second member;

comparing an accumulated value of the reduction of the press reaction force with a predetermined range between a lower limit and an upper limit; and determining whether the clip is correctly fitted in dependence upon said comparing.

3. A method of coupling a first member and a second member by a clip and a screw, the method comprising:

a preparing step of making the first member to face the second member in a state of attaching a base portion of a clip to the first member, wherein the first member has a first side and a second side, wherein the clip includes a barrel portion, wherein the base portion of the clip is on the first side of the first member and the barrel portion is on the second side of the first member;

a clip fitting step of fitting the clip to a clip hole on the second member by a press pad directly pressing the base portion toward the second member with the barrel portion penetrating the clip hole on the second member, wherein the clip includes a spacer element positioned between the first and second members in the clip fitting step; and a screw fastening step of connecting the first member to the second member by the screw;

detecting a reduction of a press reaction force when the first member is pressed to the second member;

comparing an accumulated value of the reduction of the press reaction force with a predetermined range between a lower limit and an upper limit; and determining whether the clip is correctly fitted in dependence upon said comparing.

\* \* \* \* \*